COMPUTER CONTROL SYSTEM FOR METALS ROLLING MILL

Original Filed Dec. 10, 1963 18 Sheets-Sheet 1

INVENTORS.
ROBERT G. BEADLE
DONALD A. LEHR
HUGH S. MAXWELL

COMPUTER CONTROL SYSTEM FOR METALS ROLLING MILL

Original Filed Dec. 10, 1963 18 Sheets-Sheet 2

COMPUTER CONTROL SYSTEM FOR METALS ROLLING MILL

Original Filed Dec. 10, 1963 18 Sheets-Sheet 5

COMPUTER CONTROL SYSTEM FOR METALS ROLLING MILL

Original Filed Dec. 10, 1963 18 Sheets-Sheet 6

COMPUTER CONTROL SYSTEM FOR METALS ROLLING MILL

Original Filed Dec. 10, 1963 18 Sheets-Sheet 8

COMPUTER CONTROL SYSTEM FOR METALS ROLLING MILL

Original Filed Dec. 10, 1963 18 Sheets-Sheet 9

COMPUTER CONTROL SYSTEM FOR METALS ROLLING MILL

Original Filed Dec. 10, 1963 18 Sheets-Sheet 10

AUDIO-VIDEO PERIPHERALS 117
RECORDING PERIPHERAL 118

COMPUTER CONTROL SYSTEM FOR METALS ROLLING MILL

Original Filed Dec. 10, 1963 18 Sheets-Sheet 18

United States Patent Office

Re. 26,996
Reissued Dec. 8, 1970

26,996
COMPUTER CONTROL SYSTEM FOR METALS ROLLING MILL

Robert G. Beadle, Schenectady, N.Y., Donald A. Lehr, Orange, Calif., and Hugh S. Maxwell, Schenectady, N.Y., assignors to General Electric Company, a corporation of New York Original No. 3,332,263, dated July 25, 1967, Ser. No. 339,048, Dec. 10, 1963. Application for reissue July 11, 1969, Ser. No. 846,989
Int. Cl. B21b *37/12*
U.S. Cl. 72—7 37 Claims

Matter enclosed in heavy brackets [ ] appears in the original patent but forms no part of this reissue specification; matter printed in italics indicates the additions made by reissue.

*ABSTRACT OF THE DISCLOSURE*

*Methods and apparatus are disclosed for rolling hot steel strips in a multistand mill, preferably with a computer to perform multiple control functions rapidly. Performance is enhanced by determination of driving power for each stand and interstand gages are derived from stored data representing the appropriate one of a stored family of cumulative power curves, each applicable for a different range of delivery gages. Individual stand speeds are established from the mass flow relation based upon the desired final stand speed and delivery gage fed into the system, with forward slip taken into account. From the determined interstand gages, the forces to be exerted by the respective stands are derived from stored data representing the appropriate one of a family of cumulative force vs. thickness curves, each curve being applicable for a different range of delivery gages. Such force values are then used to derive from stored, nonlinear stretch curves, the individual stand stretches which are combined with the determined interstand gages to establish commands for screw setting servos, thereby to adjust the unloaded roll openings appropriately for the desired interstand gages. Screw settings can be corrected according to exponential functions of the times when hot metal is present or absent in the stands, thereby to compensate for thermal expansion or contraction.*

*The determined driving powers and speeds for the several stands are compared with stored values of rated or limit power and speed capabilities, and if the commanded values fall outside the limits, the setup commands are determined again with different power proportioning, or at different final stand speed, or the operation of the system is terminated if impossible operating conditions are called for.*

*Errors in interstand gages during actual rolling of a steel strip, as determined by comparing values derived from load cell signals (gagemeter gages and actual speed and delivery gage sensor signals (mass flow gages), are used to partially update factors included in the stored data, so that set-up determinations for subsequent strips will become progressively more accurate. This is called adaptive interstand gage feedback. Also, the sensed actual driving powers for the several stands during rolling of a strip are compared with the powers calculated from the appropriate one of the stored power curves based upon actual interstand gages, and any errors are used to partially update factors included in the stored data, so that set-up determinations for subsequent strips will become progressively more accurate. This is called adaptive load distribution feedback. For adaptive roll speed feedback, commanded roll speeds are compared with actually measured roll speeds during rolling of a strip, and any errors are employed to partially update factors included in the stored data, so that setup for subsequent strips will become progressively more accurate. Adaptive roll force feedback is accomplished by computations comparing actual roll forces sensed by load cells with predicted forces calculated from stored force curve data and interstand gages actually being rolled on a strip, and by utilizing any discrepancies to partially update factors included in the stored data, so that set-up for successive strips becomes more accurate. Such adaptive feedback corrections inherently reflect the particular characteristics of the steel being rolled and of the mill being controlled, and automatically compensate for the steel characteristics and for changes in mill characteristics due to aging or wear.*

This invention relates to the rolling of steel and means for controlling such operations automatically.

More specifically, the invention relates to the automatic operation of a hot strip steel mill under the direction of a control computer. In this connection the computer not only carries a stored operational program, but also is arranged to receive input and external control data for combination therewith and to make regular inspections of the results of its own operational control data for further combination therewith and subsequent updating of its stored program.

A feature of the invention is the monitoring and accrual of data determined from one cycle of operation for modifying control data for a succeeding cycle of operation. This updating feature is brought about through automatically recalculating certain critical input data necessary to the proper functioning of the strip mill control "set-up."

Another feature of the invention is the automatic checking of a strip mill operation by comparison of calculated data and actual operational data through a part of the cycle of operation whereby disagreement between these data brings about a corrective control "set-up."

The art of working metals is exceedingly old, and the art of rolling steel until recently might be considered to have been a craft. Basically a major part of the activities of the modern steel industry is not metallurgy, or the production of steel from its raw constituents, but the reduction in size of a quantity of steel to predetermined dimensions. Refinement in the production of steel bars, rails, rods, plates and strips has been made continually over the years; however, this production has been accomplished under strictly manually controls, the skill of the operator manipulating the controls being all important. With the advent of multiple stand, rolling mills, and particularly in the production of steel plates, sheets or strips, certain semi-automatic devices have been developed from time to time for the purpose of improving the accuracy of the process and the quality of the products; nevertheless, until the present invention materialized steel has been rolled almost exclusively under the control of human operators.

Initially, the rolling mill operator may be considered to have had a simple task. His job consisted merely in setting a pair of rolls to exit ductile metal of a predetermined width and thickness different from that entering the rolls. However, trial and experiment, together with advance in metallurgical concepts, proved conclusively that the quality of the finished product depended upon more than the mere squeezing of the metal from one cross-sectional area to another. As a result the operator of a rolling mill became confronted with additional factors such as "rolling speed," "rolling temperature," "interstand tension," "scaling," "roll wear," and many other facets entering into the production of finished steel material. Each operator thereafter became skilled in the manner of production according to his calculated "hunch," based primarily upon his dexterity at manual manipulation according to past and current observations of the rolling process.

As further refinements and specifications became more and more demanding of the outputs of steel rolling mills certain semi-automatic controls were introduced to assist the operator during rolling operations; e.g., the gage control system illustrated in U.S. Patent 2,726,541, and devices such as these, together with so called "looper" controls for preventing loops or "cobbles" between stands of a strip mill. These rolling mill modifications improved the operator's chances of meeting the rolling requirements. Nevertheless, the current requirements of a steel rolling mill leave much to be done by the mill operator that appears to be beyond his ability to do or comprehend within the time limits conducive to economical production.

For example, in a six stand, multiple stand hot strip mill the operator, prior to commencing the rolling operation, must:

(a) Ascertain the finish gage (thickness).
(b) Ascertain the finish width.
(c) Ascertain the finish temperature.
(d) Know the type of steel.
(e) Know the entry temperature.
(f) Know the characteristics of the steel being rolled.
(g) Know the mill condition, e.g., which rolls may be worn, etc.
(h) Know the drafting practice for the mill under the conditions of (g).
(i) Know the proper speed of rolling to produce the desired finish temperature.

Keeping the above factors in mind, the operator must also work out the mill "set-up" at least for the following:

(1) Speeds for 6 stands (each may be different).
(2) Screwdown settings (roll openings) for 6 stands (each may be different).
(3) Sideguide settings for 7 positions along the rolling path.
(4) Initial X-ray setting.

During the rolling process the operator must also perform certain tasks necessary to the successful production of the desired items being rolled; e.g., the operator must:

(I) Control the speed of each stand, or be prepared to do so.
(II) Continually observe the looper heights, and be prepared to act.
(III) Continually observe output gage of the mill, and be prepared to make corrections when necessary.
(IV) Continually observe and be prepared to correct screwdown settings.
(V) Record observations in the category of [(1) to (6)] *(I) to (IV)*, above, to improve mill "set-up."
(VI) Level the mill stands.
(VII) Be alert for emergencies.

Bearing in mind all of the above-noted duties and responsibilities, it is quite obvious that the rolling mill operator must be indeed a unique individual, if not an [artst,] *artist,* in the manipulation and operation of the multitude of activities necessary to be followed to deliver finished steel strip according to modern requirements.

It is, therefore, an object of this invention not only to provide certain improvements of set-up and control of the operation of a hot strip mill for automatically performing the customary duties of the mill operator, but also to take over the actual operational control of the mill; i.e., to materially automate the steel rolling process.

[An essential component of the invention is provided by a computer of the type described and claimed in co-pending applications Ser. Nos. 70,549, Patent No. 3,311,885; 74,975, 74,976 and 76,220 filed respectively Nov. 21, 1960, Dec. 9, 1960, Dec. 9, 1960 and Dec. 16, 1960. The latter three are now U.S. Patent Nos. 3,461,855, 3,461,856 and 3,461,857. It is to be pointed out, how-] *A computer suitable for use in the practice of the present invention is described in copending application Serial No. 70,549, filed November 21, 1960 and assigned to the assignee herein, and U.S. Patents Nos. 3,311,855; 3,161,855; 3,161,856 and 3,161,857. It is to be pointed out, how-* ever, that the inclusion of a computer component is not merely the establishment of a programmed operation in the process of rolling steel since in the present invention the computer performs functions outside the realm of its program in accordance with past and current conditions of operation, making decisions to optimize operating conditions, updating its own stored data for future operations of like nature, and halting a current operation when the conditions of operation indicated by the set-up or control become impossible of performance.

The principal functions of the computer component normally, as explained in detail hereinafter, are concerned with:

(a) Finish gage (from order sheet);
(b) Finish temperature (from order sheet);
(c) Type of steel (from order sheet);
(d) Deviation from normal drafting (from operator);
(e) Entry temperature (from sensors);
(f) Entry gage (from sensors);
(g) Entry width (from sensors);
(h) Stand speeds (set up by computer);
(i) Screwdown control settings (set up by computer);
(j) Initial gage control settings (set up by computer);
(k) Sideguards (set up by computer);
(l) X-ray gage datum (set up by computer).

Under these conditions the mill operator, therefore, is required to be responsible for the mill condition and speed/temperature characteristics to be fed to the computer input prior to mill "set-up," and during the actual rolling operation to be prepared to meet emergencies and [handles] *to handle* such matters as levelling of the mill stands when required.

It is therefore an object of this invention to provide an automated steel rolling mill system wherein the active participation of a mill operator is normally only incidental to the completion of the process.

Another object of the invention is to provide an automated steel rolling mill system wherein the control of all operations is normally directed by a computer.

The subject invention is not to be confused with a mere stored program type of operation, one of the features of the system being not only to resolve and compute data derived from stored and current inputs, but also to constantly revise or update data from recorded operational functions previously directed and store such data for future references.

It is therefore another object of the invention to provide an automated steel rolling mill system having both data storing and data monitoring capabilities whereby the former characteristic is continually modified by the latter characteristic.

Still another object of the invention is to provide an automated steel rolling mill system having means for making operational control decisions resulting from data derived from one cycle of operation for modifying control decisions in a subsequent cycle of operation.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGURE 1, comprising FIGURES 1A and 1B, is a schematic view of a hot strip mill illustrating the basic requirements of control necessary to be exercised by a mill operator.

FIGURE 2, comprising FIGURES 2A, 2B, 2C and 2D, is a schematic view of a hot strip mill showing some of the automatic aids provided a mill operator during the actual rolling process.

Figure 5A:
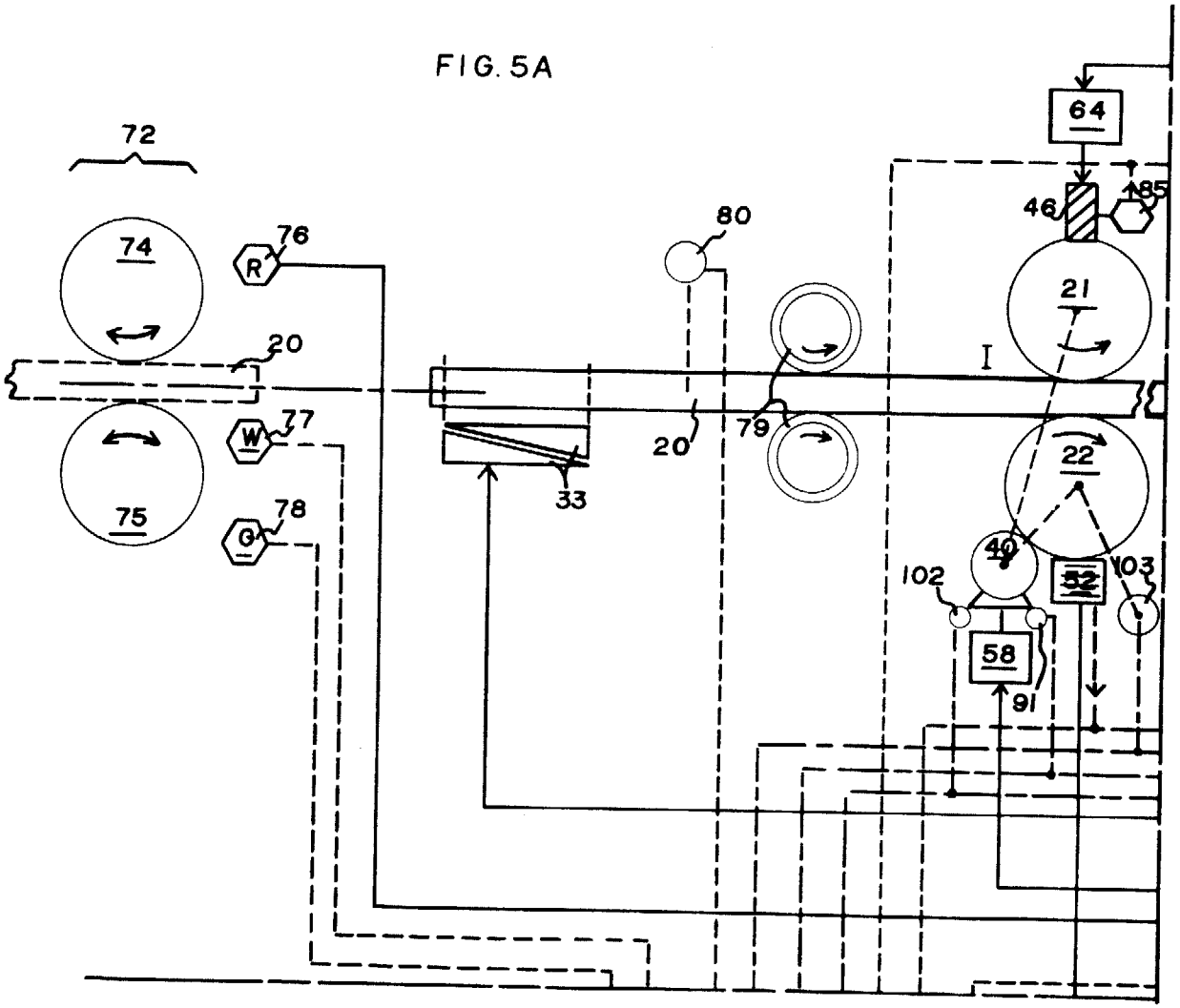
Figure 5B:
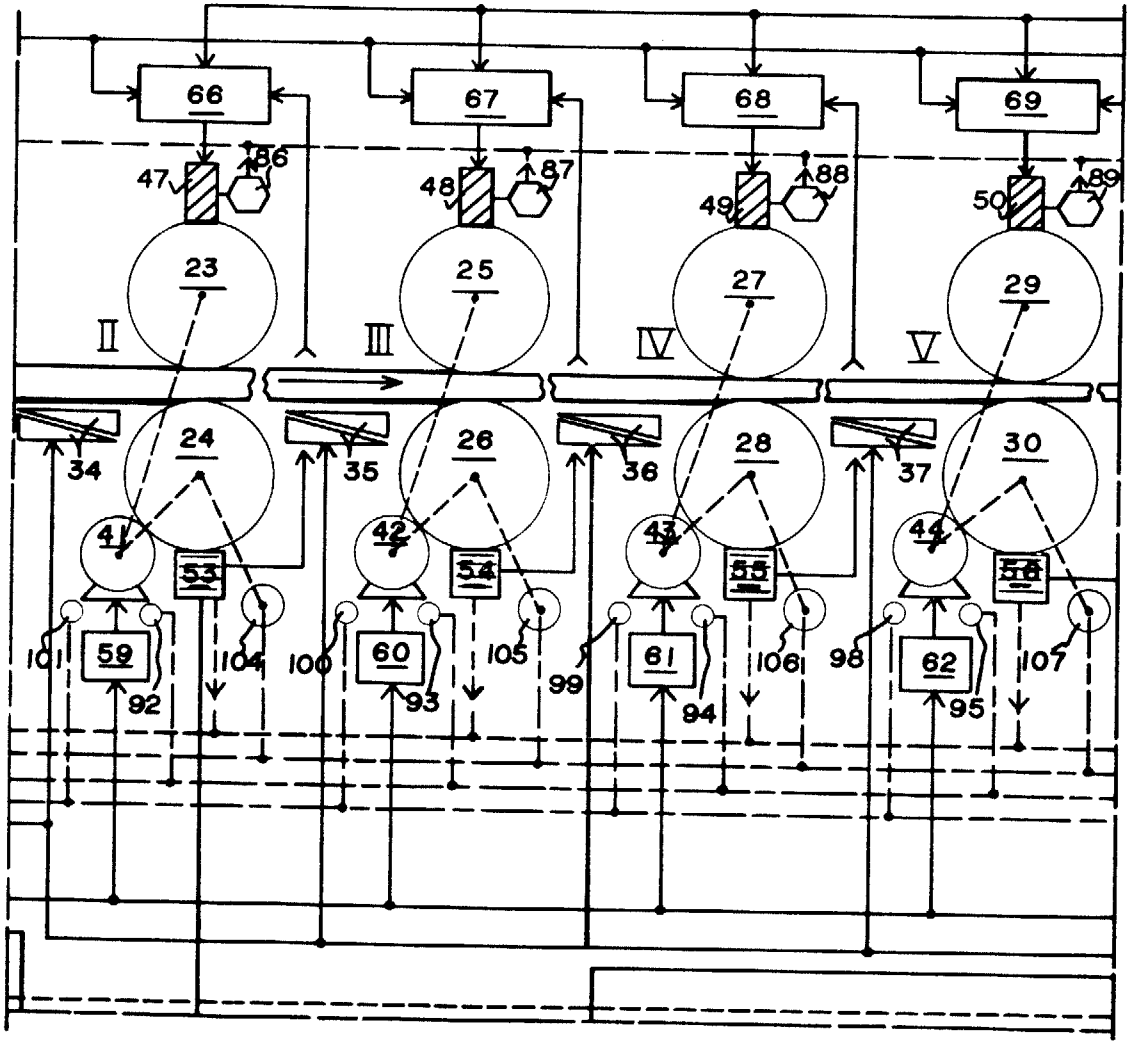
Figure 5C:
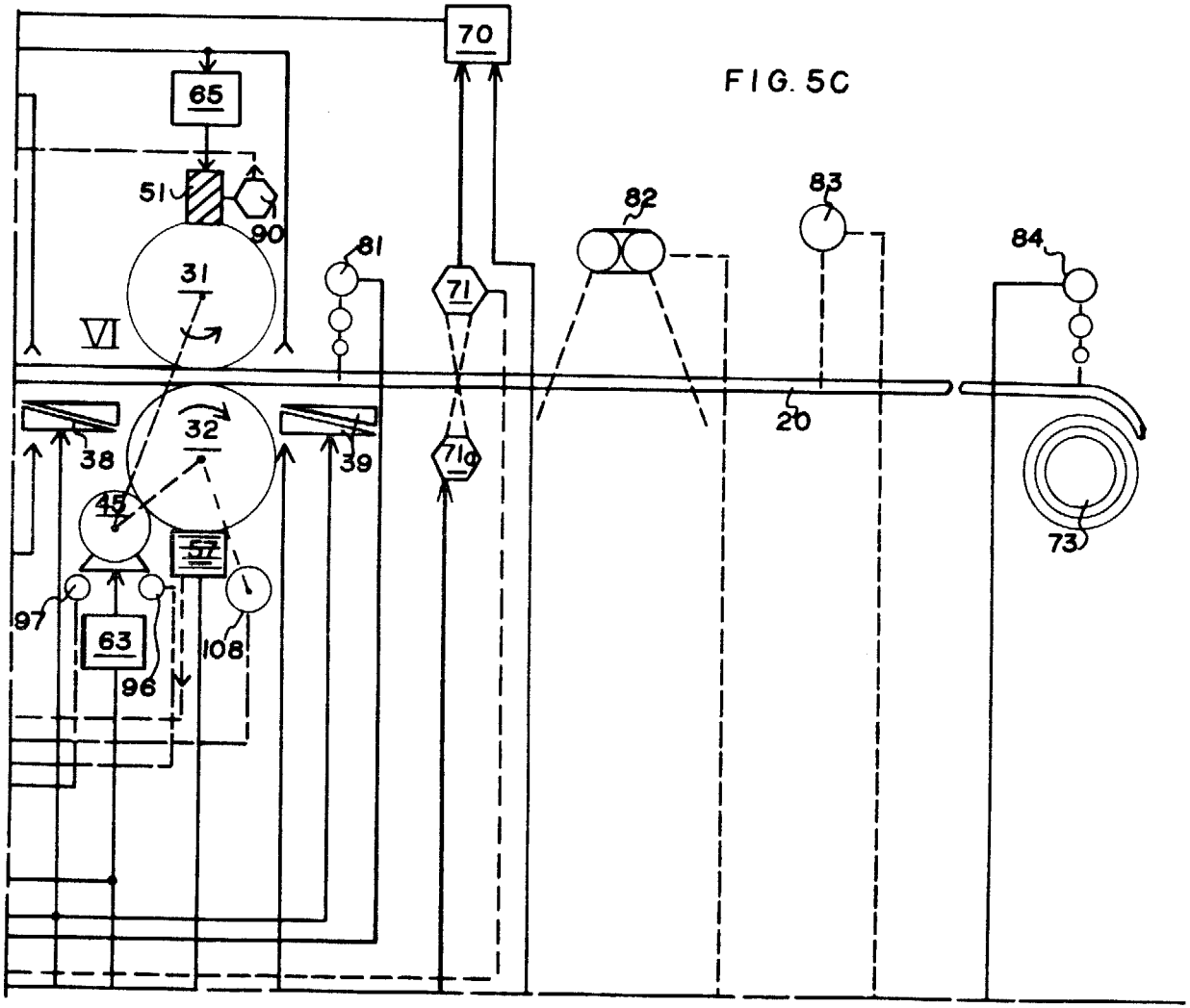
Figure 5D:
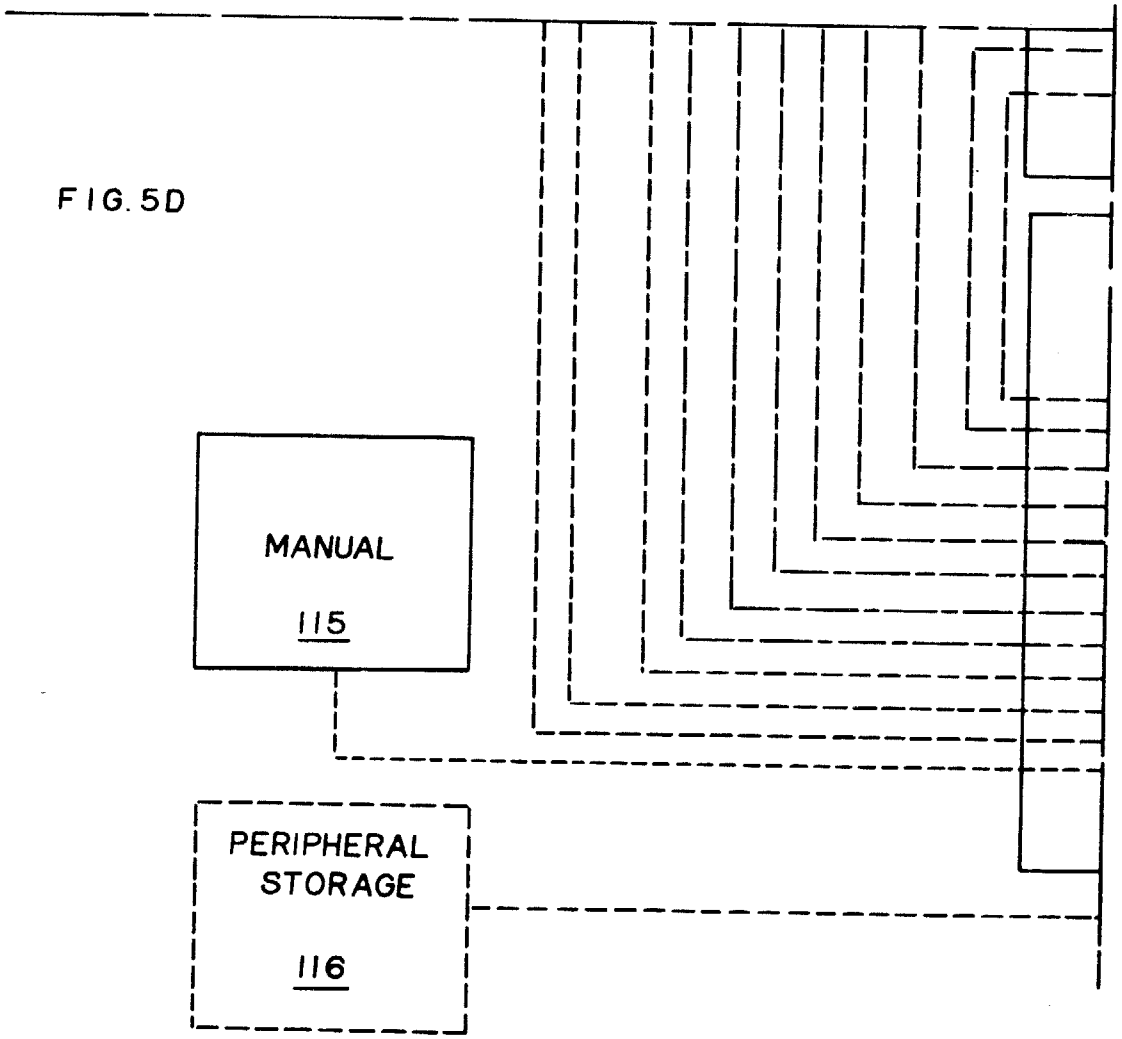
Figure 5E:
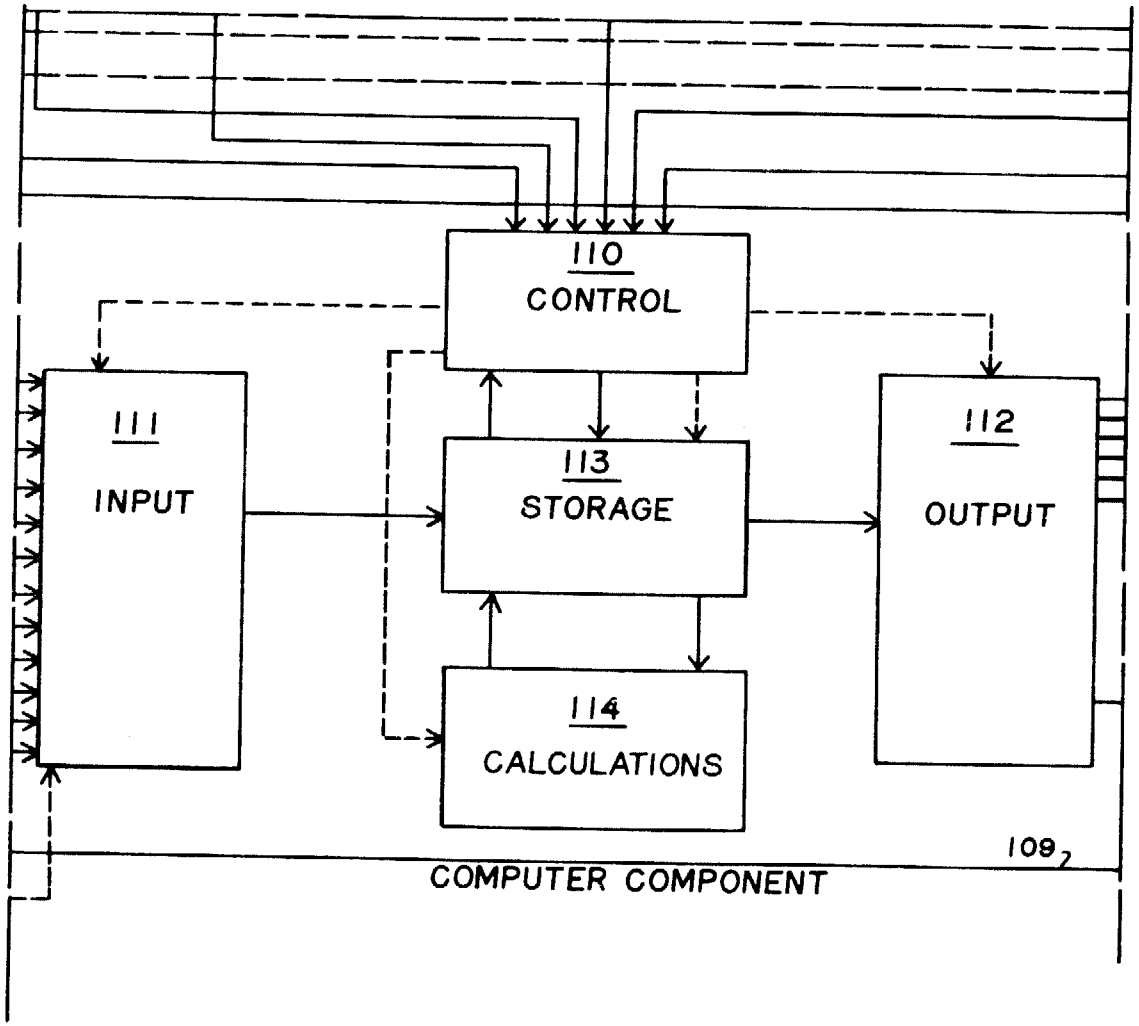
Figures 5, 5A, 5B, 5C, 5D, 5E, 5F:
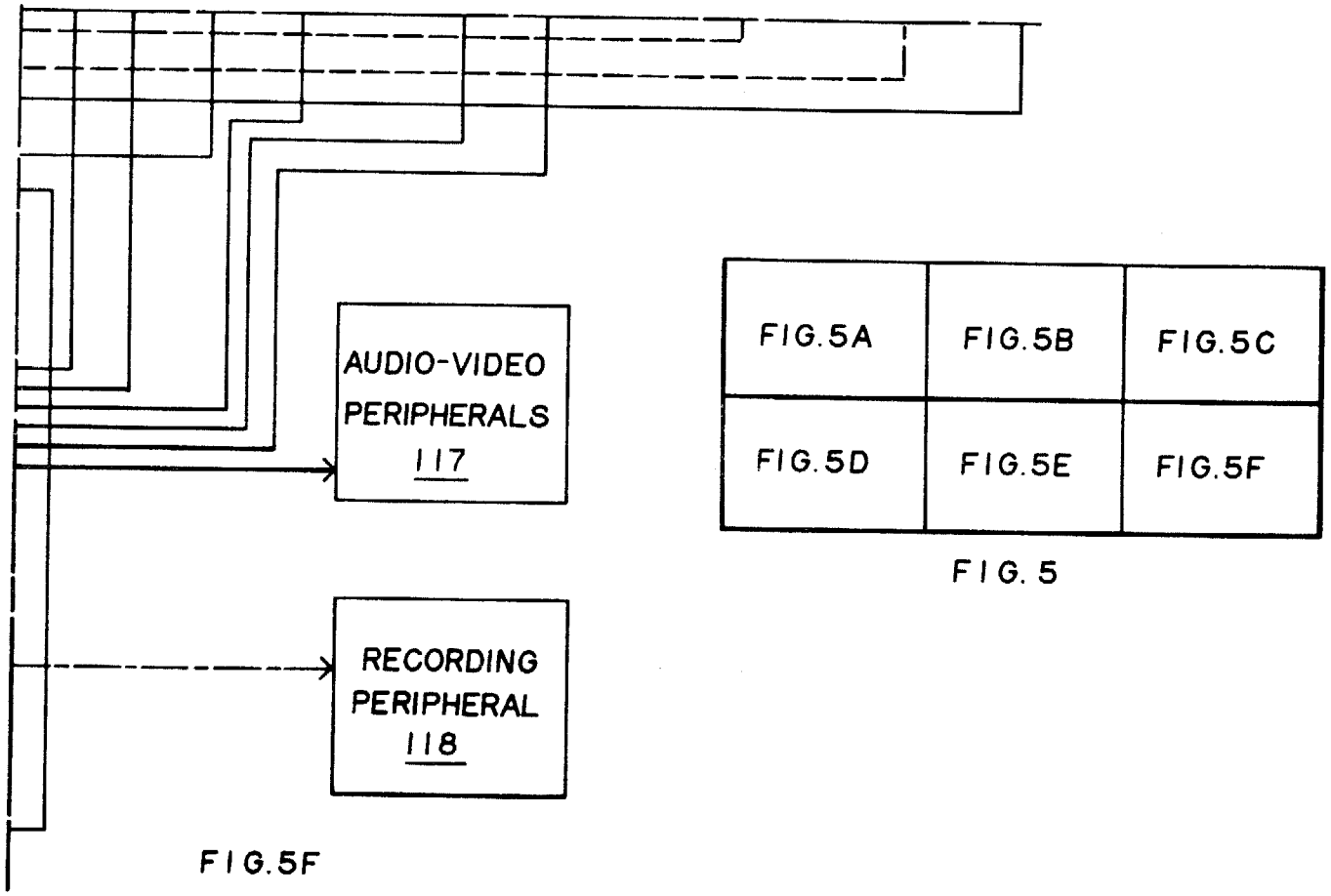

FIGURE 5, comprising FIGURES 5A, 5B, 5C, 5D, 5E and 5F, is a schematic view of an automated, multi-stand, hot strip steel rolling mill according to the present invention, together with its control accessories.

Figure 6:
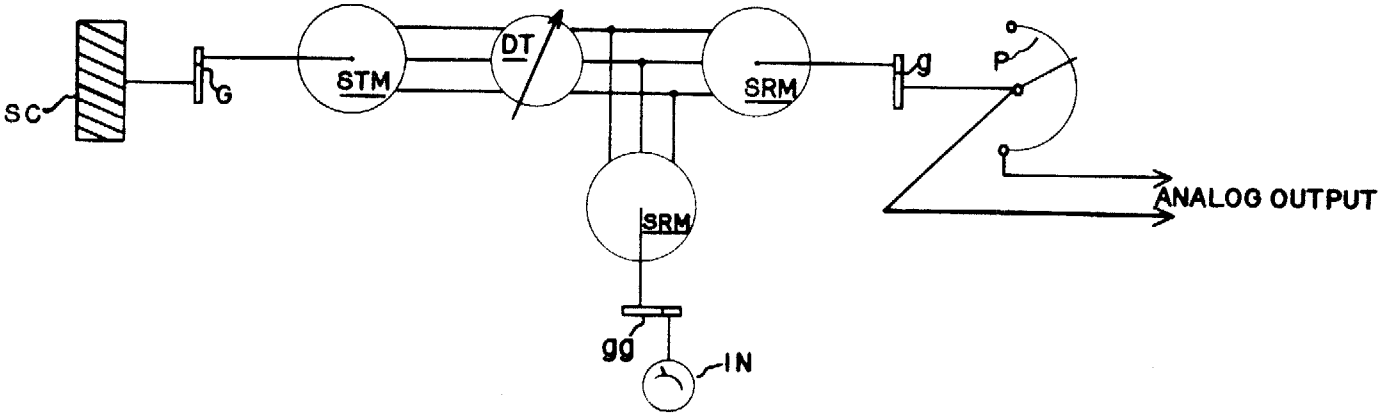

FIGURE 6 illustrates schematically a manner in which an intermittent mechanical motion of a component of the arrangement of FIGURE 5 may be converted into an electrical signal.

Figure 7:
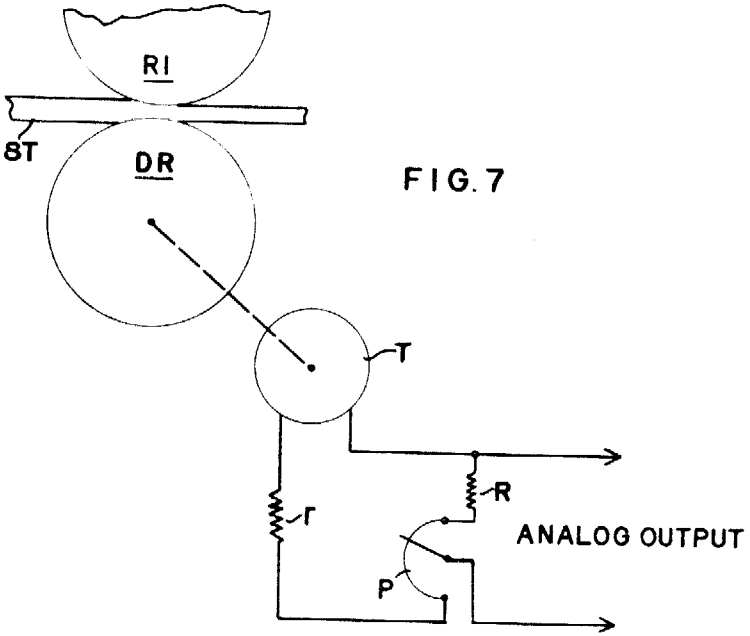

FIGURE 7 illustrates schematically a manner in which a continuous mechanical motion of a component of the arrangement of FIGURE 5 may be converted into an electrical signal.

Figure 8:
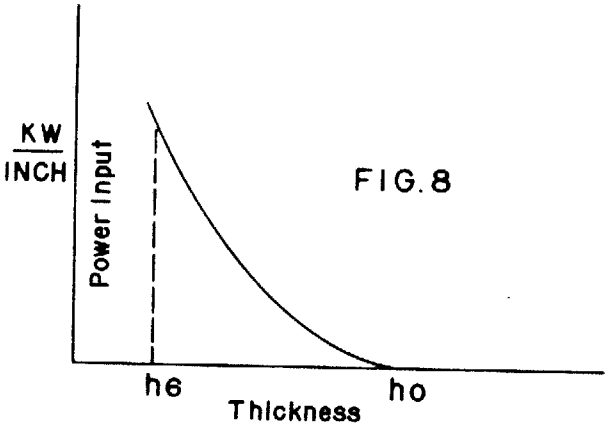

FIGURE 8 is a diagram of a power curve in respect to the power supplied to the [stand] *stands* of a rolling mill as visualized in the present invention.

Figure 9:
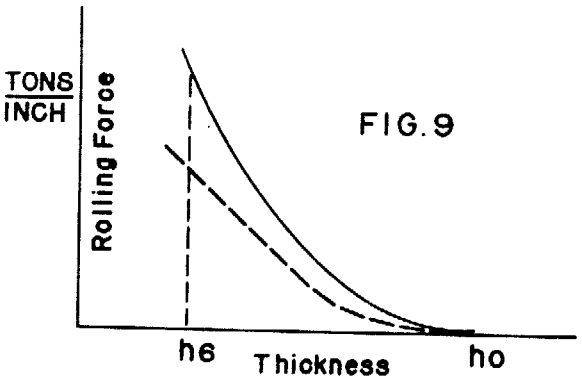

FIGURE 9 is a diagram of a force curve in respect to the force applied between the rolls of a mill stand.

Figure 10:
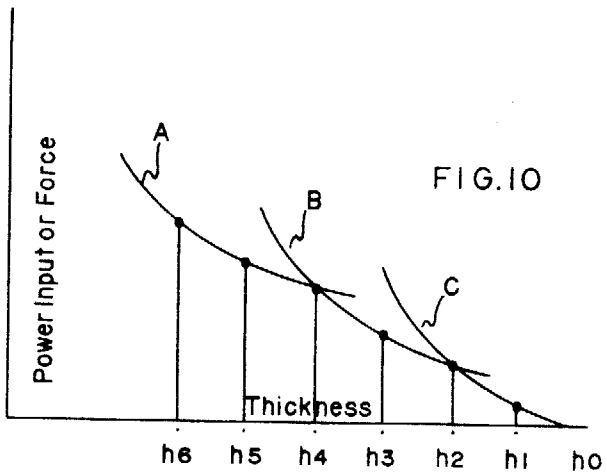

FIGURE 10 is a diagram of a modified power or force curve as illustrated in FIGURES 8 and 9 adapted for actual control of mill stands in a steel mill rolling process as visualized in the present invention.

Figure 11:
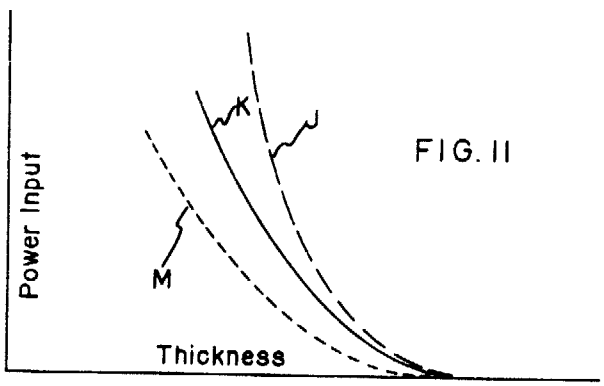

FIGURE 11 is a diagram illustrating the variation with temperature in a power curve as shown in FIGURE 8.

Figure 12:
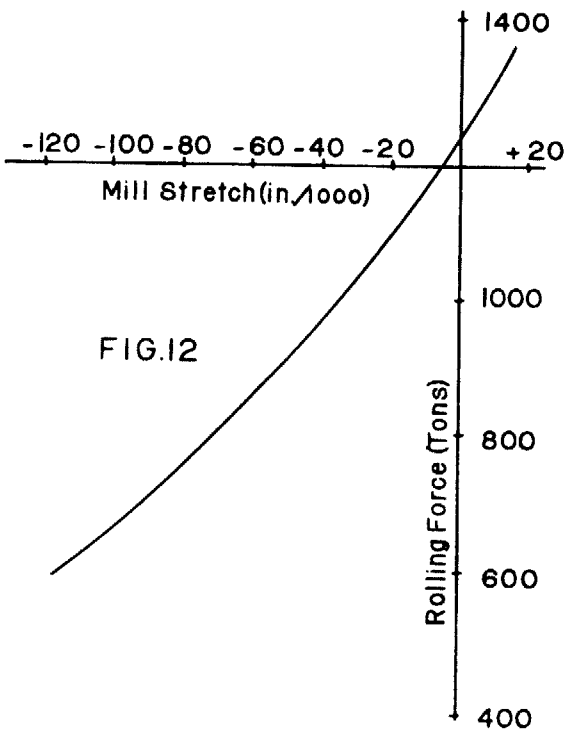

FIGURE 12 is a diagram illustrating the elasticity of a mill stand in accordance with the magnitude of the rolling force applied to its rolls.

Figure 13A:
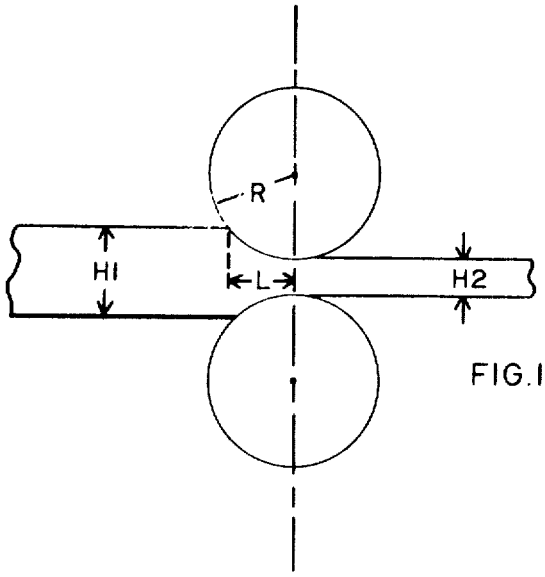

FIGURE 13a is a schematic view of a pair of rolls in a mill stand representing a theoretical solution in the determination of roll separating force in a mill stand.

Figure 13B:
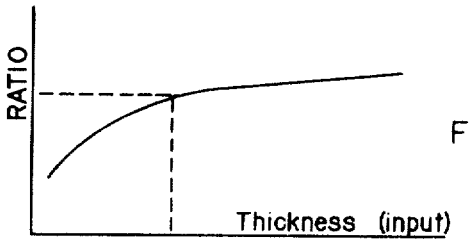

FIGURE 13b is a diagram illustrating certain characteristics of the theoretical solution shown by FIGURE 13a.

Figure 14:
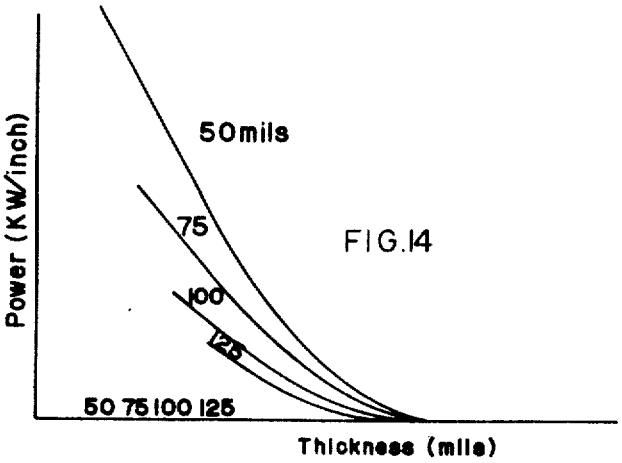

FIGURE 14 illustrates diagrammatically the relationship between *a plurality or family of* power curves and the various stands in a multi-stand rolling mill in respect to a different *final exit or delivery* gages of strip.

Figure 15:
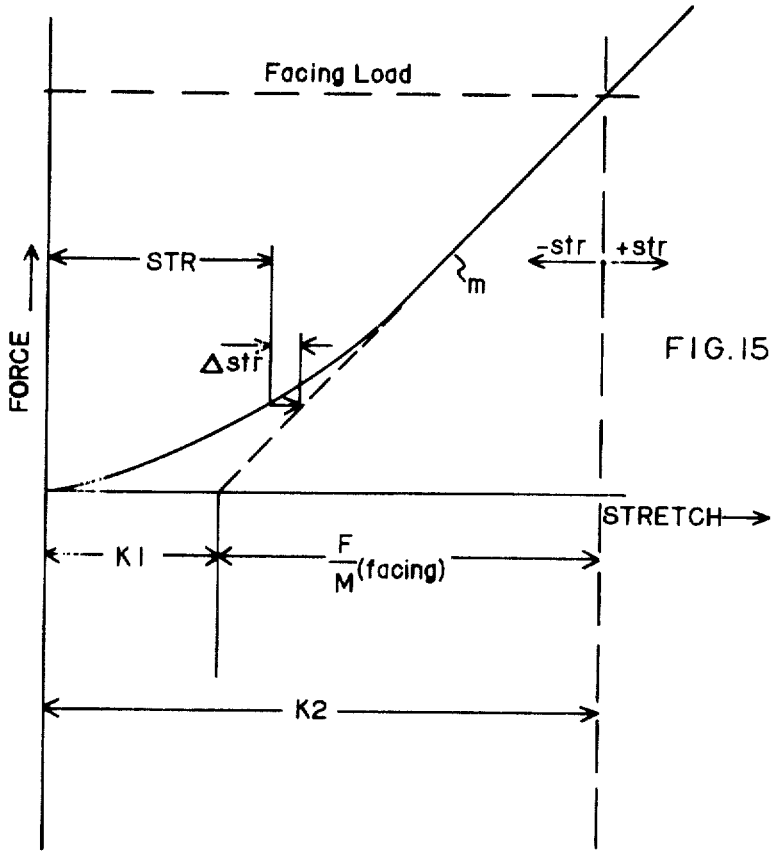

FIGURE 15 is a curve chart illustrating a stretch curve of a mill stand.

Figure 16:
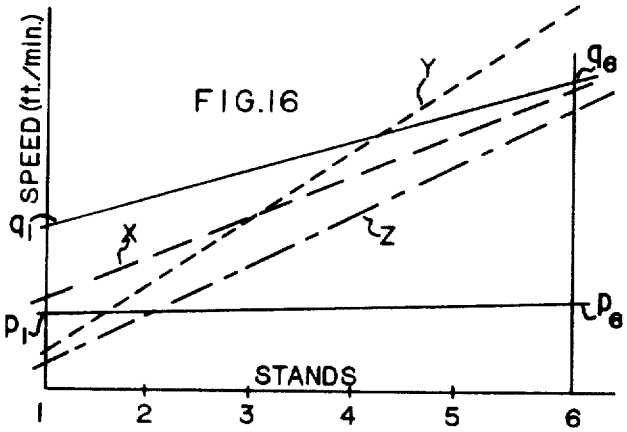

FIGURE 16 illustrates diagrammatically the manner in which the speed requirements are correlated in setting up the mill to ascertain that operations will be within the mill's capabilities.

Figure 1:
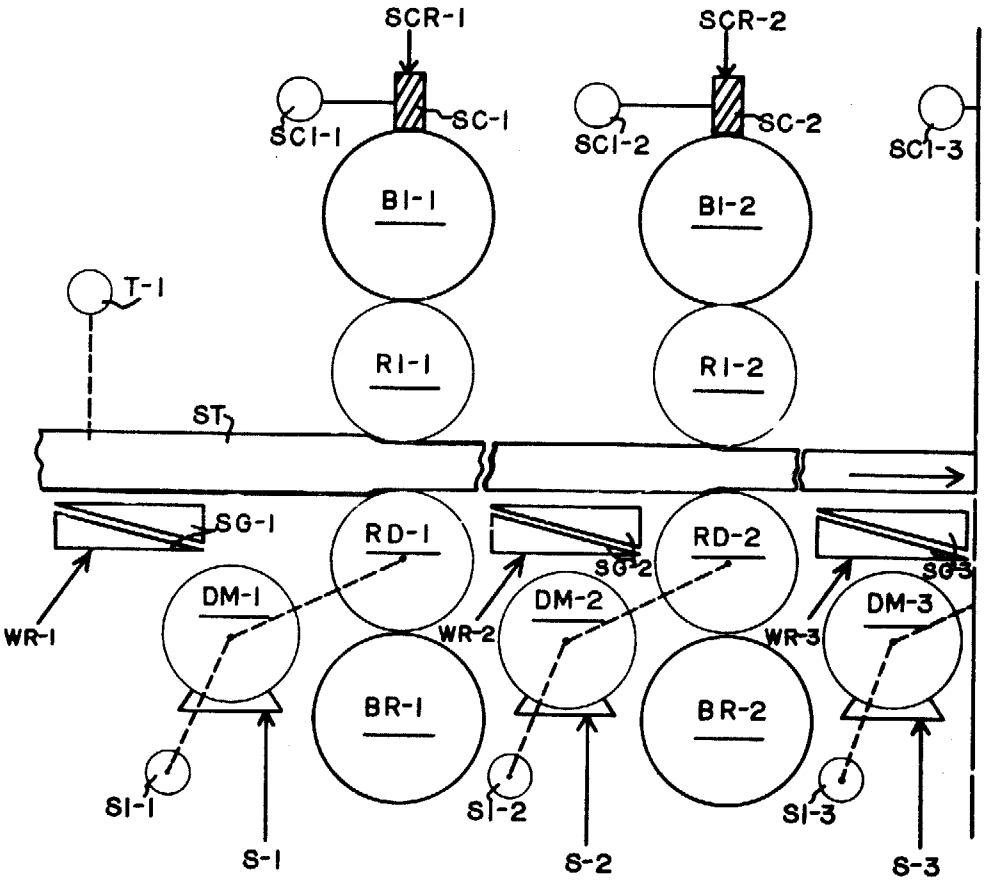
FIG. 1 PRIOR ART
Figure 1B:
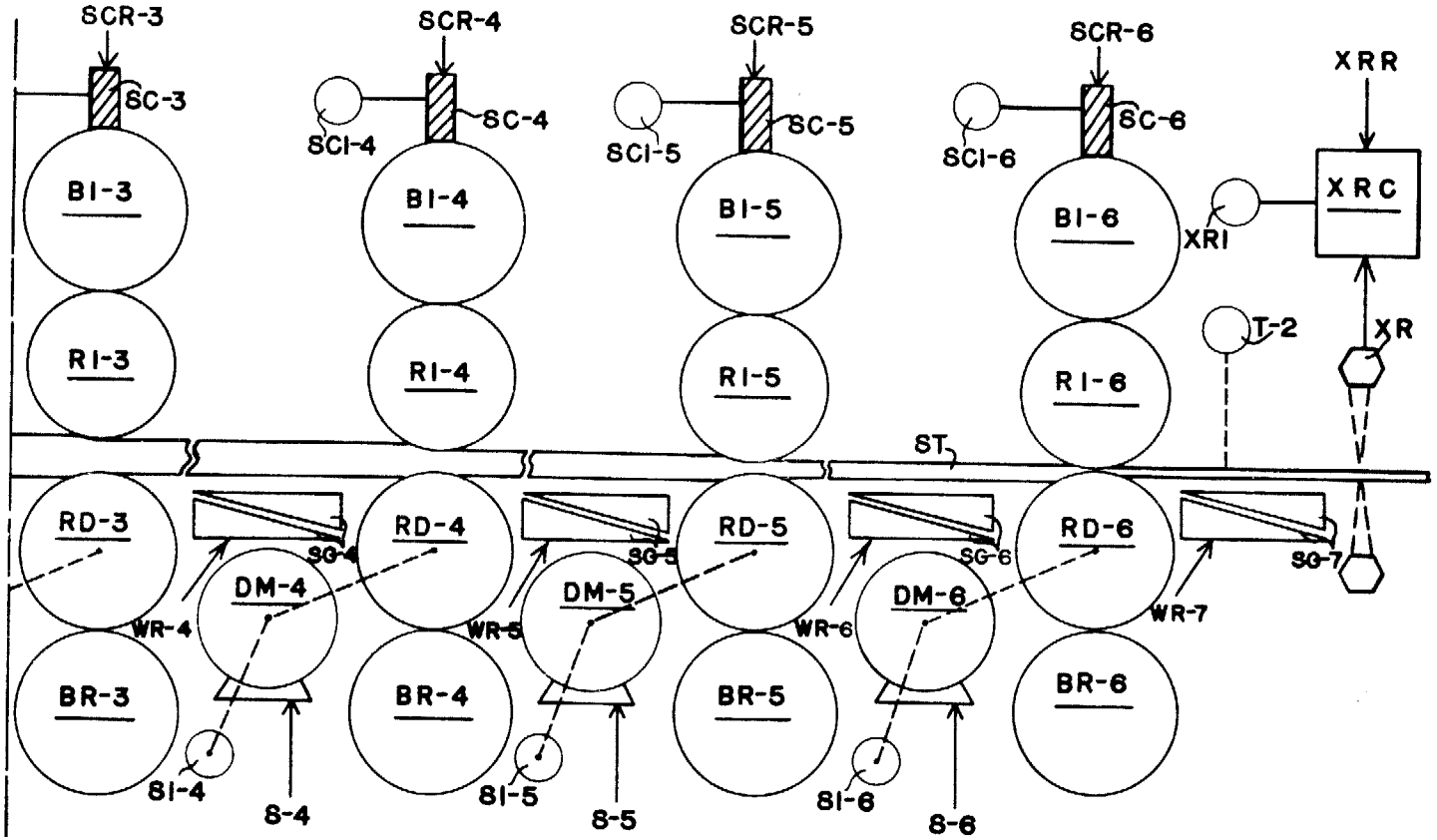

Referring to FIGURE 1 a strip of metal (for example, steel) ST is shown in the process of being rolled to a predetermined thickness or gage through a multi-stand hot strip mill having six (6) sets of rolls, each stand successively reducing the thickness of the strip ST, the entering temperature of the strip being indicated by a pyrometer T-1 and the exit temperature of the strip ST being indicated by a pyrometer T-2. The entering thickness or gage of the strip ST is determined from data supplied from a source such as a roughing mill (not shown), and the exit or delivery thickness is measured by an X-ray gage XR. The strip is guided through the mill by a series of sideguides SG-1, SG-2, SG-3, SG-4, SG-5, SG-6, and SG-7 spaced along the path of the mill and interspersed between the sets of rolls. Each set of rolls is supported in a mill stand (not shown) and includes a driving roll, such as the rolls RD-1 RD-2, RD-3, RD-4, RD-5, and RD-6, these rolls being driven respectively by the drive motors, DM-1, DM-2, DM-3, DM-4, DM-5, and DM-6, each drive motor having a speed indicator such as the tachometers SI-1, SI-2, SI-3, SI-4, SI-5, and SI-6. The driving rolls, aforementioned, are geared respectively to coact with rolls RI-1, RI-2, RI-3, RI-4, RI-5, and RI-6 to reduce the thickness of the strip under forces applied via backing rolls, the backing rolls, BR-1, BR-2, BR-3, BR-4, BR-5, and BR-6 coacting respectively with the driving rolls and the backing rolls, BI-1, BI-2, BI-3, BI-4, BI-5, and BI-6 coacting respectively with the idler rolls.

Force is applied to each set of rolls by a screw, such as the screws SC-1, SC-2, SC-3, SC-4, SC-5, and SC-6, the positions of the respective screws being representative of the roll openings of each set of rolls through which the strip ST passes and being indicated by indicators SCI-1, SCI-2, SCI-3, SCI-4, SCI-5, and SCI-6, respectively.

The arrangement shown in FIGURE 1 represents a prior are hot strip mill, and in preparation for running a strip through a mill of this character the mill operator must provide input data such as the settings of the sideguards WR-1, WR-2, WR-3, WR-4, WR-5, WR-6, and WR-7, the drive motors' speed settings S-1, S-2, S-3, S-4, S-5, and S-6 and the roll openings settings SCR-1, SCR-2, SCR-3, SCR-4, SCR-5, and SCR-6. The mill operator must also adjust the X-ray via a control XRC so that the X-ray indicator XRI reads the thickness of the exiting strip accurately in accordance with the type of metal (normally steel) being rolled. The magnitudes of each of these settings are principally determined prior to rolling by historical statistics of past runs of the same material that have gone through the mill under the same conditions of temperature, delivery of exit gage (thickness), delivery speed, input gage and load (force) distribution for each stand of the mill. During the run the operator (by reference to the various indicators hereinbefore mentioned) makes gradual changes for correcting his settings of speed and roll openings for each stand to preserve the desired exit gage (as indicated by the X-ray gage indicator XRI) under the conditions of speed and load distribution which have been chosen. It is quite obvious that the control efficiency of the mill operator is the key factor in the output effectiveness of such a rolling process, and the performance of his duties in this connection is a speculative task.

Figure 2:
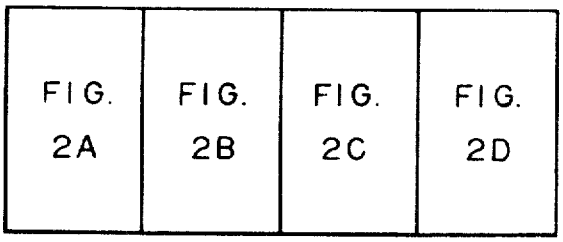
FIG. 2 PRIOR ART
Figure 2A:
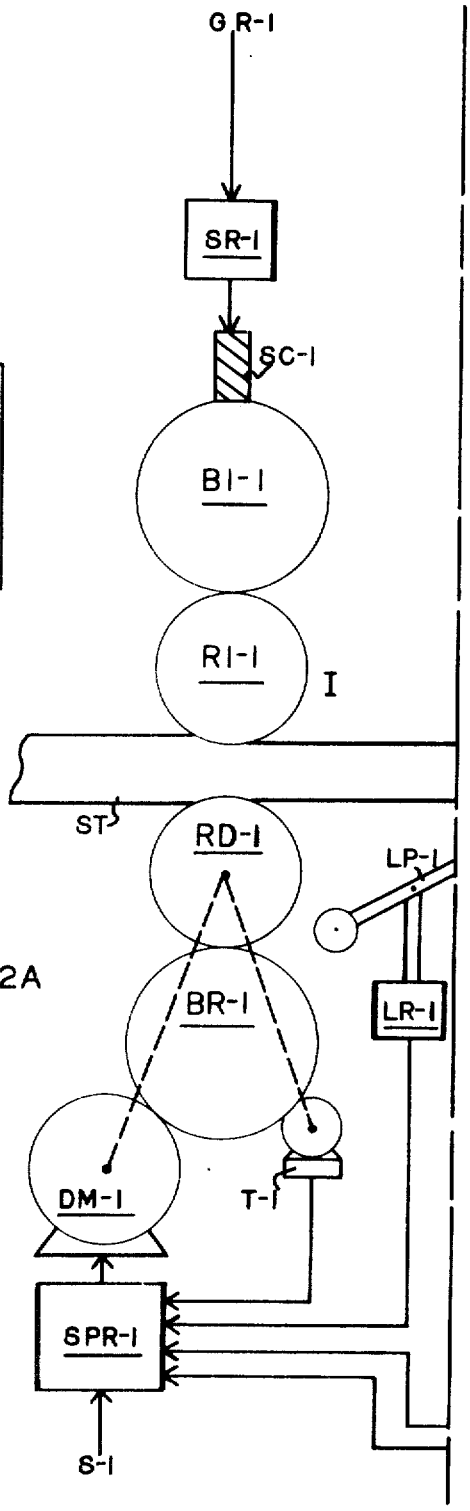
Figure 2B:
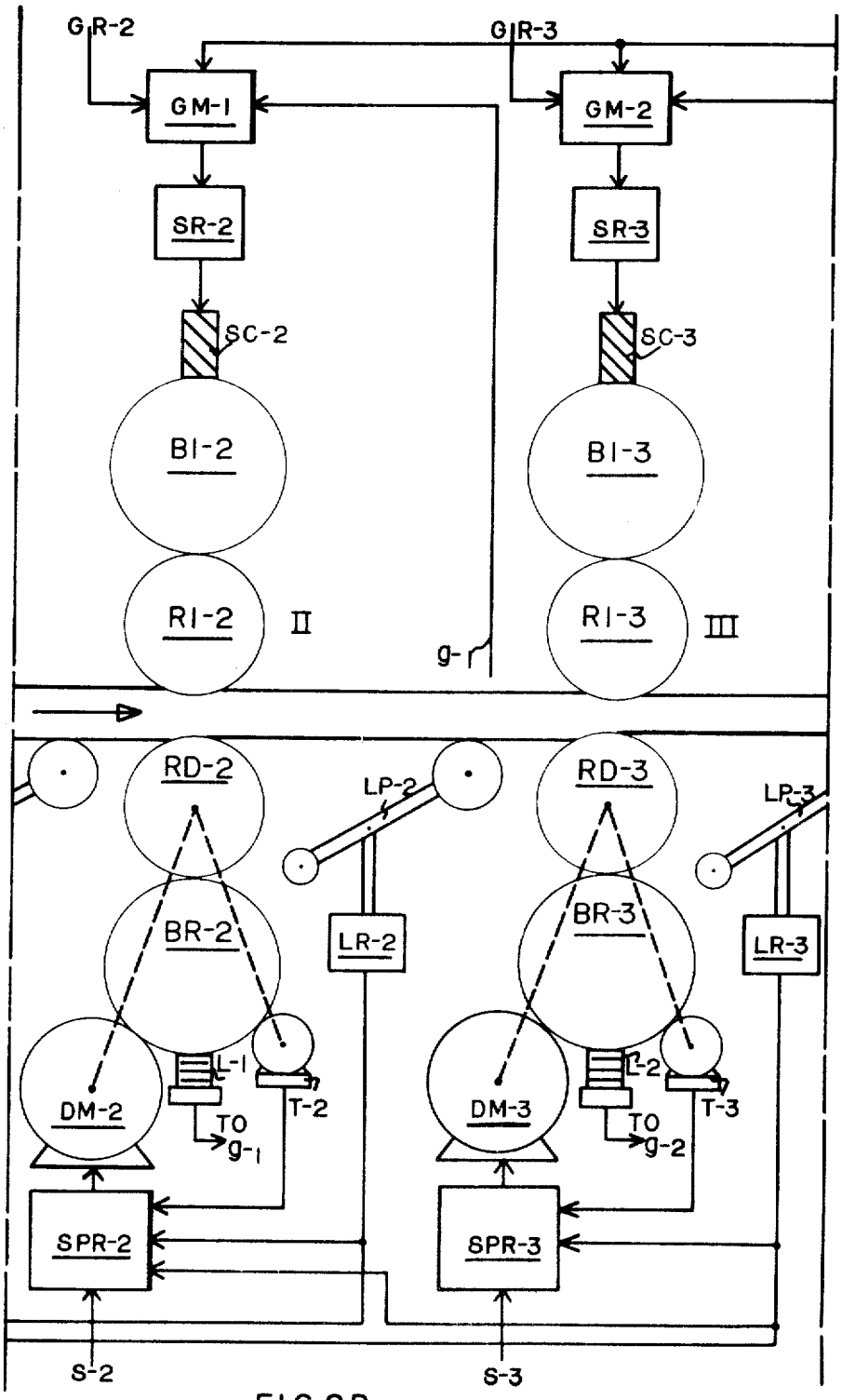
Figure 2C:
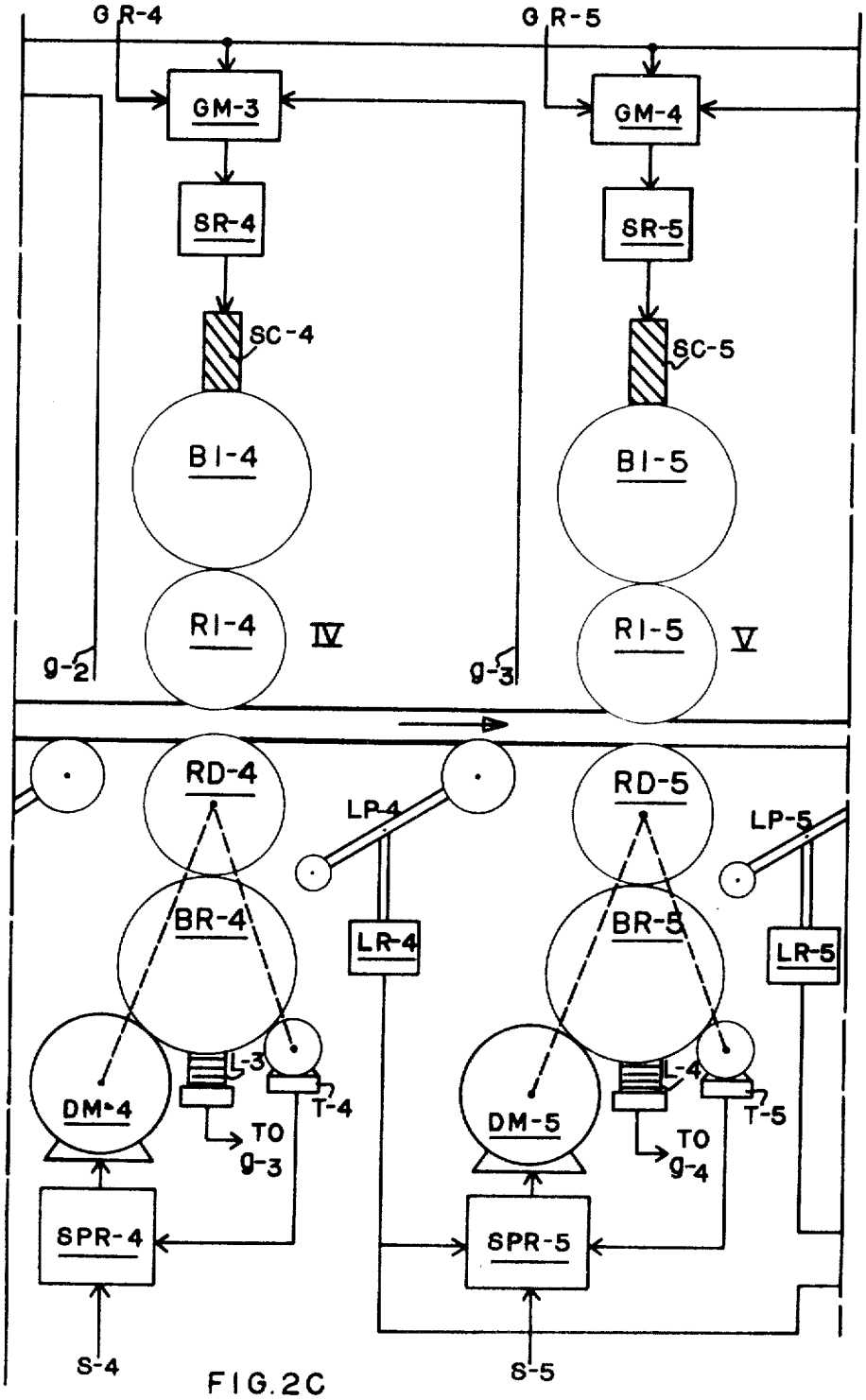
Figure 2D:
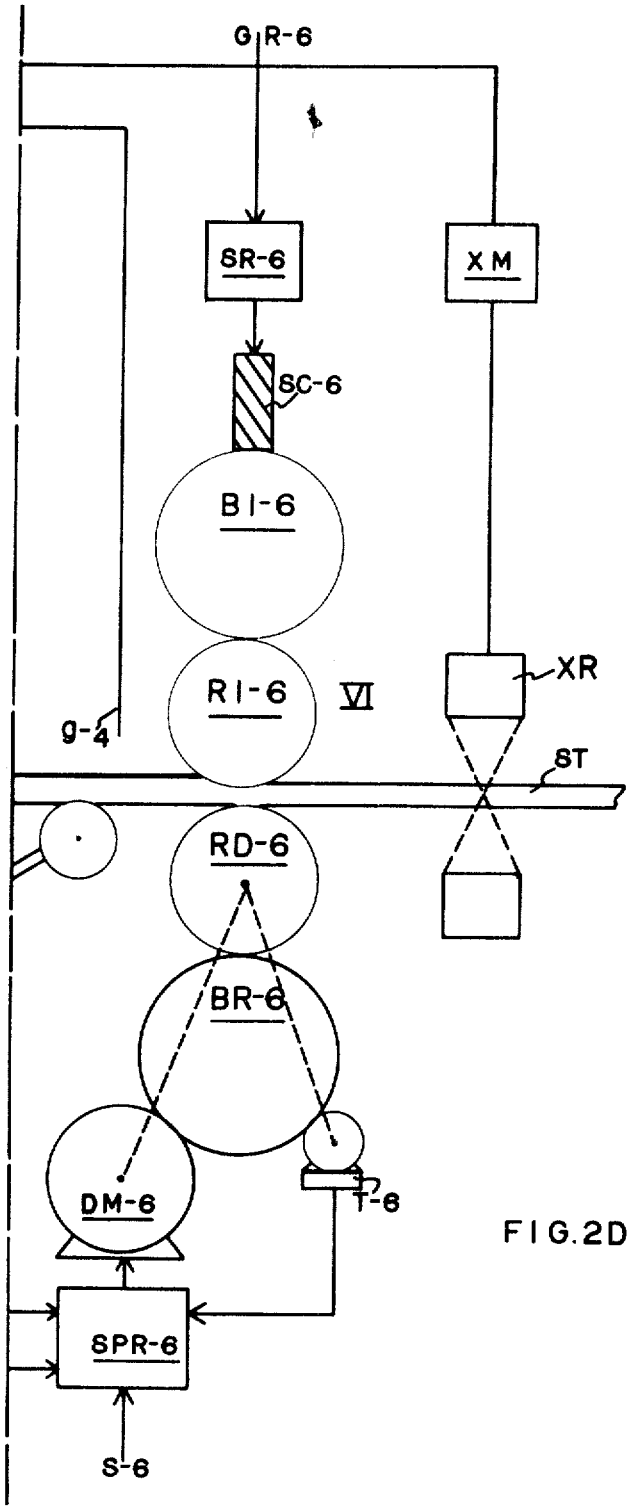

In order to improve the mill operator's control effectiveness and thereby insure more reliable end products from a hot strip mill certain automatic control features may be incorporated into the arrangement illustrated by FIGURE 1. Referring now to FIGURE 2, which is substantially similar to FIGURE 1, the sideguards SG-1, SG-2, etc. being eliminated for clarity together with the speed indicators SI-1, SI-2, etc., and the indicators SCI-1, SCI-2, etc., certain of these features have been added both to improve the quality of output and to insure safety of the mill operation and operating personnel. For example, the speed of each mill stand I, II, III, IV, V, VI is controlled by a speed regulating system. Referring specifically to stand I (FIGURE 2) the drive motor DM-1, which drives the rolls RD-1 and RI-1, is fed through a voltage integrator *, i.e., what may be functionally termed an algebraic summing amplifier,* SPR-1 whereby a speed corresponding to a voltage setting S-1 is maintained constant via a feedback from a tachometer T-1 coupled to the drive roll DR-1. FIGURE 7 illustrates one manner in which this is accomplished in that a tachometer T coupled to a roll DR furnishes a voltage output through a resistor R to a voltage divider comprising a potentiometer P and a resistor R, the potentiometer P being used for regulating the amount of voltage feedback to represent an analog output to the integrator SPR-1 (FIGURE 2). In this manner the speed of the rolls RD-1 and RI-1 is maintained at a relatively constant rate according to the initial setting S-1.

After the strip enters the stands I through VI (referring again to FIGURE 2) a further speed control is provided by the looper controls LP-1, LP-2, LP-3, LP-4, and LP-5 located among the various stands. The looper controls are power urged against the underside of the strip in the form of pivoted levers carrying rollers at their free ends, and since there is a normal level of the strip between each pair of stands the position of each looper under that condition may be taken as normal. Looper regulators LR-1, LR-2, LR-3, LR-4, and LR-5 may be potentiometers (not shown) having their movable arms mechanically connected to the looper levers, the outputs of the potentiometers being fed into the speed (voltage) integrators SPR–1, SPR–2, SPR–3, SPR–5, and SPR–6. It is to be noted that the integrator SPR–4 associated with stand IV is not controlled from any looper regulator since this stand is normally maintained at constant speed, speed variations arising from looper control being applied to the remaining stands, I, II, III, V, and VI.

Briefly, in the event that the level of the strip between stands III and IV lowers, indicating that the speed of stand III is too high in respect to the speed of stand IV, the looper regulator LR–3 under control of looper LP–3 will change its voltage feedback into integrator SPR–3 to reduce the speed of stand III. Conversely when the droop between stands III and IV decreases, indicating that the speed of stand III is too low in respect to the speed of stand IV, the looper regulator LR–3 under control of looper LP–3 will increase the speed of stand III. It is to be noted that looper regulator LR–3 also carries feedback voltage to the integrators SPR–1 and SPR–2 since a change in the speed of stand III, for example, all other conditions remaining the same, will cause a change in the droop of the strip between stands II and III and so on.

In a similar manner looper regulator LR–4 also carries feedback voltage not only to integrator SPR–5, but also to integrator SPR–6. While the looper control system just described is primarily intended to prevent doubling over of the strip between rolling stands, introducing "cobbles" that would destroy the current run of strip through the mill and endanger both personnel and the mill structure and controls, a secondary and equally important purpose of this system is to prevent undue tension from developing in the strip and thereby producing undesired width variations in the strip.

A further automatic control is provided to offset variations in thickness of the strip brought about by interstand changes due to temperature, hardness variations in the material being rolled, roll wear and other factors developing during the rolling operation. Normally therefore on most of the stands, for example, stands II through V, load cells L–1, L–2, L–3, and L–4 are provided under the backing rolls BR–2, BR–3, BR–4, and BR–5 respectively to measure the rolling forces as the strip progresses through the mill. The outputs of these load cells in the form of analog voltages are fed to gage integrators GM–1, GM–2, GM–3, and GM–4 similar to the speed (voltage) integrators having preset gage settings introduced by the mill operator such as GR–2, GR–3, GR–4, and GR–5 respectively in order to control the gage of each stand accordingly. A system of this kind is fully explained in U.S. Patent 2,726,541 and requires no further elaboration here. It is to be noted, however, that a similar control of thickness variation may be obtained via a feedback from the X-ray gage XR through a voltage integrator XM and applied to the gage integrators controlling the roll openings of all stands so affected as indicated in FIGURE 2.

The outputs of the gage integrators are fed to the screwdown controls SR–2, SR–3, SR–4, and SR–5 in respect to stands II through V for setting roll openings. Stands I and VI, as shown in FIGURE 2, have their roll opening settings fed directly to the screwdown controls SR–1 and SR–6, respectively. The screwdown controls normally are motor driven (motors not shown) to adjust the roll openings of the stands I through VI by the adjusting screws SC–1 through SC–6, and these motors may be controlled in various well known ways such as servos and the like. Where it is necessary to obtain an analog voltage representative of the roll opening, for purposes explained later herein, resort may be had to an arrangement as shown in FIGURE 6. Here the screw SC is coupled via gearing G to a selsyn transmitter STM, through a differential transformer DT to a selsyn receiver SRM, which may via gearings g or gg connect to an arm of a potentiometer P to give an output analog voltage or to a visual indicator IN.

While the automatic controls described in the preceding paragraphs tend to reduce the speculative nature of the mill operator's tasks, particularly during the actual rolling process; nevertheless, the present invention contemplates a degree of automation wherein the operator's duties are relegated to nothing more than casual supervision of mill operation, together with emergencies. Furtheremore, in setting up the mill controls prior to each run and each different item the operator has neither the time nor the capacity to correct for variations of many conditoins in the mill per se that may vary from item to item or from one run to another. More than this, however, the manual set-up of the mill may be modified only by slight, haphazard changes by the operator so that when the process for any item to be run is set up in error (as a result of misinterpretation of the operator's previous "trial and error" experience) poor quality output results, if not the necessity of re-runs to come within the specifications required, thereby resulting in the loss of time, futility of effort, and waste of raw material.

A realistic embodiment of the present invention is therefore illustrated in FIGURE 5, the principal distinction of the embodiment being the inclusion of a computer component of the nature of that shown in copending application Ser. No. 70,549 filed Nov. 2, 1960, now U.S. Patent No. 3,311,885. The present invention, as has been previously emphasized, is not merely the coupling of a computer to a multi-stand, strip rolling mill, or the like, but the combination of such means in accordance with certain new concepts, hereinafter explained, which are fundamental to automated rolling of steel strip or like materials.

Figure 3:
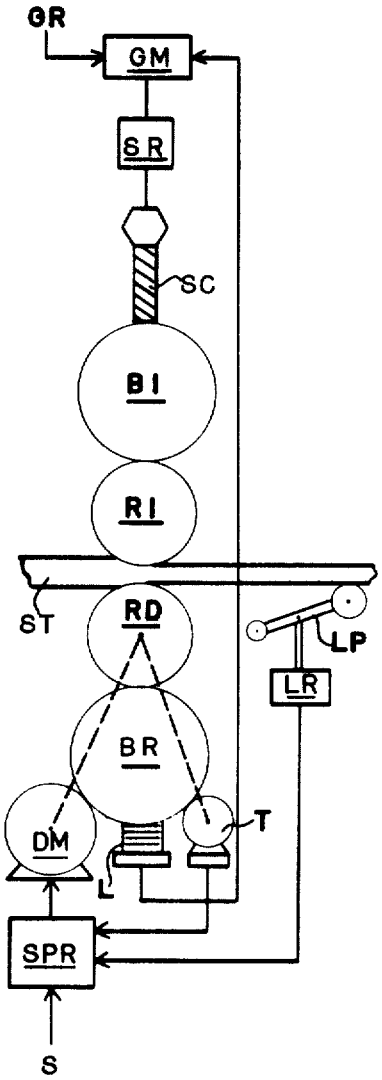
FIGURE 3 is a schematic view of a single mill stand according to the system shown in FIGURES 1 and 2.
Figure 4:
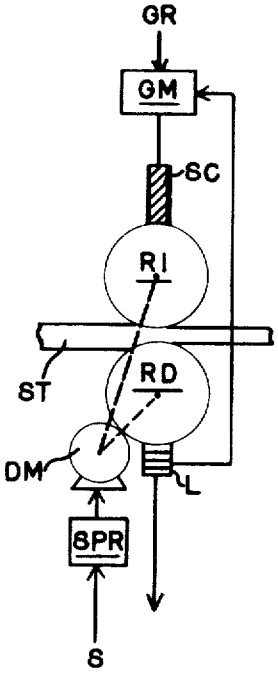
FIGURE 4 is a schematic view of a single mill stand equivalent to that shown in FIGURE 3 (for purposes of simplification in the system illustrated in FIGURE 5).

FIGURE 3 illustrates a single stand of a rolling mill as described in the preceding description of FIGURE 2. In FIGURE 3 a strip ST of metal is being reduced by rolling between the rolls RI and RD and the respective backing rolls BI and BR, the roll force between the rolls being measured by a load cell L. FIGURE 4 is a simplified version of FIGURE 3, illustrating a single stand of a rolling mill as described below in connection with FIGURE 5 wherein the backing rolls BI and BR are omitted for the sake of simplicity, the load cell L being shown as applied directly to the rolls RI and RD for measuring the force exerted therebetween. The structure of FIGURE 4, for purposes of explanation, is a full equivalent of the structure of FIGURE 3. Each of the FIGURES 3 and 4 also includes an adjusting screw SC cooperating with the roll RI (or its back up roll BI) for adjusting the roll opening between rolls RD and RI, a drive motor DM, a speed (voltage) integrator SPR having an input S and a gage (voltage) integrator GM having an input GR. Load cell feedback from load cell L to integrator GM is shown in each figure; however, looper control, while shown in FIGURE 3, is to be implied in FIGURE 4 and FIGURE 5. Similarly, the feedback of tachometer T, while shown in FIGURE 3, is to be implied in FIGURE 4 and FIGURE 5 as feeding into the speed (voltage) integrator SPR, and the screwdown control SR, while shown in FIGURE 3, is also implied in FIGURE 4 and FIGURE 5. Specifically with reference to FIGURE 5, also, dotted lines normally indicate manual or operator data, dashed lines input data other than manual, dash-dot lines data logging, and solid lines output or control output data.

Referring now to FIGURE 5 there is depicted a hot strip mill operating upon a strip 20 comprising six mill stands having respectively the driving rolls, 22, 24, 26, 28, 30 and 32 and the respective coacting rolls 21, 23, 25, 27, 29, and 31 between which the strip 20 passes. Sideguides 33, 34, 35, 36, 37, 38, and 39 along the path of the strip 20 provide limits of edge travel of the strip 20, each sideguide being independently controlled from the output 112 of the computer component. The driving rolls 22 through 32 are driven respectively by drive motors 40, 41, 42, 43, 44, and 45, voltage being furnished to these motors via speed (voltage) integrators 58, 59, 60, 61, 62, and 63, respectively, each integrator being independently controlled from the output 112 of the computer component. Adjusting screws 46, 47, 48, 49, 50, and 51 are for setting the rolls 21 through 31 respectively to control roll openings between those rolls and the driving rolls 22 through 32 previously mentioned. The adjusting screws 46 through 51 are controlled via gage (voltage) integrators 64, 66, 67, 68, 69, and 65, respectively, each integrator receiving independently from the output 112 of the computer component. Load cells, 52, 53, 54, 55, 56, and 57 for measuring load force are associated with the driving rolls 22 through 32, respectively, the load cells each providing an independent input to the computer component input 111, load cells 52, 53, and 57 also providing inputs to the computer component control 110, and load cells 53, 54, 55, and 56 providing feedback (automatic gage control) to the gage integrators 66, 67, 68, and 69 respectively. Each of the last mentioned gage integrators is also supplied an input from an X-ray (voltage) integrator 70, the latter being fed from an X-ray gage 71 and also from the computer component output 112. The X-ray gage 71 also provides an input to the computer component input 111, and is in turn fed from the output 112 of the computer component via 71a.

Prior to entering the aforementioned driving rolls and the coacting rolls the strip 20 is acted upon by a roughing mill stand 72 having the rolls 74 and 75. The roughing mill is provided with means 77 for measuring the final width of the entering strip 20 and with a gage measurement 78 of the final thickness of entering strip 20, each of these measuring devices providing an input to the computer component input 111. There is also provided a relay 76 to furnish a signal to the computer control component 110 when the strip 20 finally emerges from the rolls 74 and 75. Prior to the strip 20 entering the first stand of the strip mill, i.e., between the rolls 21 and 22, its temperature is measured by a pyrometer 80 providing an input to the computer component input 111, and the strip is also passed between a pair of de-scaling rolls 79.

After the strip leaves the last pair of rolls of the strip mill, i.e., rolls 31 and 32 it is passed by a hot metal detector 81, which provides an input to the computer component control 110, by a width gage 82, providing an input to the computer component input 111, by a pyrometer 83, also providing an input to the computer component input 111, and by another hot metal detector 84 having an output that is fed to the computer component control 110, the strip 20 being eventually delivered to a coiler 73 by which it is finally coiled. Screw position indicators representative of roll opening are provided for each pair of driving rolls as indicated by voltage indicators 85, 86, 87, 88, 89, and 90, each of these indicators providing an input to the computer component input 111.

The driving rolls 22 through 32 are coupled respectively, directly to the tachometers 103, 104, 105, 106, 107, and 108, each tachometer independently feeding an input to the computer component input 111, and the drive motors 40 through 45 are provided with motor current measuring devices 91, 92, 93, 94, 95, and 96, respectively, each providing independently (as a voltage drop thereof) an input to the computer component input 111. Means are also provided for each drive motor by the voltage recorders 97, 98, 99, 100, 101, and 102, for providing an input to the computer component input 111 whereby the voltages may be passed through the computer component and recorded upon a peripheral device 118 such as a typewriter, tape, et cetera.

Manual inputs 115 such as corrections for roll diameter of the driving and idler rolls are also provided as inputs to the computer component input 111, and peripheral storage data 116 may be fed into the computer component input 111 to supplement the data contained in the storage 113 of the computer component. The computer component output 112 also provides signals to the audio-video peripherals 117 so that when limits, as hereinafter described, of the functions of the mill apparatus are exceeded, suitable alarms may be given to the operator in his supervisory role.

Fundamentally in the process of rolling steel strip there are essentially three basic factors; namely, that the strip have finite width, and that there be an opening between the rolls, and that the strip be moving between the rolls at some speed. In a multi-stand strip mill, therefore, since the strip is being reduced from stand to stand the product of the width, thickness and speed at one stand is equal to the product of the width, thickness and speed at another stand. This is sometimes called mass flow, and since the width is held constant this relationship may be expressed:

$$[h_1 \text{ times } V_1 = h_1 \text{ times } V_1 V_1 = V_1]$$

$$h_i \textit{ times } V_i = \textit{constant}$$

where $h_i$ is the thickness (gage) out of any *selected* stand (mils)
$V_i$ is the velocity out of [any] *the same selected* stand (feet per minute).

For example, when the delivery speed out of a six-stand strip mill is known, together with the delivery gage, the loaded stand speeds of other stands can be determined by the relationship:

$$h_i \text{ times } V_i = h_6 \text{ times } V_6$$

where $h_6$ is the output gage of stand 6 (mils)
V is the speed out of stand 6 (feet per minute).

In an automated rolling process such as that contemplated by the present invention the rolling operation in the mill includes not only automatic gage control, speed regulators, and looper control, as previously described, but also control of the mill setup by a computer component. This setup is drived from a mathematical model rather than merely from stored setups in the computer memory, the requirements for the mathematical model being [predicted] *predicated* on the ability to distribute the total rolling load in different workable ways.

The mill setup requires that the interstand gages, stand speeds and the unloaded roll openings *for the several individual stands* can be calculated as a function of the following:

Entry gage
Width
Entry temperature
Delivery gage
Delivery speed
Load distribution
Type of material (grade of steel).

Basic data for mill setup calculations is stored in the computer component in the form of power and force curves as shown in FIGS. 8 and 9, respectively, in respect to arbitrarily chosen grades of steel. The curves for other grades are obtained by a steel grade multiplier. Initially, a power curve and a force curve are obtained for each standard *delivery* gage classification range from force and power readings taken from mill sensors during the actual rolling of steel to an arbitrarily chosen *delivery* gage within the given gage classification range, such [as] curves being taken for a given width and [spread] *delivery speed* at a known entry temperature [.] *so that a family of curves (FIG. 14) representing cumulative power and a family representing cumulative force are obtained, each curve being applicable for a given delivery gage range. The chosen delivery gage, given width, and given delivery speed existing when data for any particular curve are taken determine a base mass flow $MF_B$ which is stored (as noted below) in a per unit width form for each power or force curve. The known entry temperature is also stored as a base temperature $T_B$ with the data for each curve.* Actually, in order to adapt these curves to usefulness in the computer, *the observed data are divided by the given width so that the curves are on a per unit of width basis (power per inch of width and force per inch of width), and* hyperbolic approximations are constructed as illustrated in FIGURE 10 so that curve A fits stands 6, 5, and 4, curve B fits stands 4, 3, and 2 and curve C fits stands 2 and 1 of a six-stand mill. Each hyperbolic curve is of the form:

$$Z_i = \frac{b_0}{b_1 + h_i} + b_2$$

$$F_i = \frac{c_0}{c_1 + h_i} + c_2$$

where, $Z_i$ is the *cumulative* power input [to] *up through* any stand i (kw. per inch of width)

$F_i$ is the *cumulative* rolling force *up through* [in] any stand i (tons per inch of width)

$h_1$ is the gage out of any stand i.

To use the power and force curves, the computer component stores three coefficients ($b_0$, $b_1$, and $b_2$) for each section (A, B, or C) of the power curve, and three coefficients ($c_0$, $c_1$, and $c_2$) for each section (A, B, or C) of the force curve.

FIGURE 11 illustrates the variations in a power curve in respect to changes of strip temperature and strip delivery speed, the total power increasing directly with speed and inversely with temperature, the curve K being taken as under normal conditions of speed and temperature, the curve J representing an increase in speed, and the curve M representing an increase in temperature. It is to be noted that with force curves *such as illustrated in FIG. 9*, the total force decreases with increasing speed even though the rate of deformation thereby increases since at the higher speeds the strip enters a stand with a higher temperature, the net effect being a reduction in total rolling force.

The computer modifies the basic power and force values determined from the data stored in the computer in order to correct for *departures in the actual* plate temperature and mass flow *from the base values $T_B$ and $MF_B$ existing and stored at the time the initial curve data were obtained.*

The relationships used are as follows:

$$F' = F_{Base} W K_G \left[1 + K_V\left(\frac{MF_B - MF}{MF_B}\right)\right][1 + K_T(T_B - T)]$$

$$P' = P_{Base} W K_G \left[\frac{MF}{MF_B}\right][1 + K_T(T_B - T)]$$

where, $F'$=Total roll separating force—tons $F_{Base}$=Roll separating force per inch of width corresponding to base steel grade for a given range of delivery gages, tons W=Width of strip, inches $K_G$=Steel grade multiplier (1.0 for base steel grade)

$K_V$=Mass flow multiplier, dimensionless $K_T$=Temperature multiplier, percent per 100° F.

MF=Mass flow, mils times f.p.m. times 1.56 times $10^{-6}$ $MF_B$=Base mass flow corresponding to stored power curve, mils times f.p.m. times 1.56 times $10^{-6}$ T=Plate temperature, ° F. actual (measured)

$T_B$=Plate temperature corresponding to power and force curves, ° F.

$P'$=Total power, kw.

$P_{Base}$=Power per inch of width [per unit] *for the base* mass flow corresponding to base steel grade for a given range of delivered gages.

For reasons of strip shape and finish, the mill operator can select by manual input the reduction taken in stand 6. Thus $h_5$ is determined from the following relations:

$$h_5 = \frac{h_6}{(1 - r_6)}$$

where, $h_5$=gage out of stand 5—inches $h_6$=gage out of stand 6—inches $r_6$=reduction in stand 6—%/100

The power curve K of FIGURE 11, for example, is valid for a strip of given composition which is being rolled to a given delivery gage at a given temperature. Referring to the power curve shown in FIGURE 8, the point of intersection of the curve with the [abscissa] *horizontal axis* represents the *entry* gage of the strip, and this is also true for curve K of FIGURE 11. It is to be pointed out that reference to power is in respect to the power required to rotate the rolls of the mill stand, and this is not to be confused with the force between the rolls that is normal to the strip. [Consequently, the] *Moreover, as is well known, the ordinate at any point on the power curve represents the cumulative sum of the power inputs to all stands which act on the strip to reduce it to the gage represented by the abscissa of that point. The* curve M of FIGURE 11 may be considered to be a shift which changes the ordinate value for a change in entry temperature.

On the other hand the effect of width and rolling speed is practically linear and has been incorporated for purposes of the rolling process by specifying the power required on a unit *width* mass flow basis. Nevertheless, the power required to reduce a strip of steel is obviously a function of the temperature at each point in the mill and not merely the entry temperature, which is the only temperature that can be measured before the setup calculation for the mill. The temperature drop which occurs as the strip proceeds through the mill is a function of the strip speed, the manner in which the mill is drafted, the amount of cooling water used, et cetera; consequently, an accurate analysis or calculation of the temperature drop is exceedingly difficult to obtain. There is, however, a correlation between these variables and strip delivery gage. As a result the delivery gage may be introduced as an additional parameter in a power curve such as exemplified by FIGURE 14. This results in a series *or family* of power curves for each type of metal or *steel with each curve being applicable to a given exit or delivery gage, or a range about that given exit gage.*

Making use of these power curves under the assumption that the mass flow is constant for any given strip, the power curve *applicable for the final exit gage of the strip to be rolled* may be entered with the known entry and delivery gages to obtain the total power per unit mass flow required to perform the overall reduction. The total power may then be distributed among the stands of a multistand mill according to the operator's specification and the power curve re-entered to determine the interstand gages that will provide such load distribution, the reduction of the strip by each stand being thereby determined.

The assumption of constant mass flow permits the calculation of the strip speed at the output of each stand from the desired delivery gage and speed and the interstand gages which have been determined. Extrusion of the steel as it passes between the rolls of a mill stand, however, causes the emerging strip speed to be greater than the peripheral speed of the rolls, this being defined as Forward Slip, or $S_f$.

$$S_f = \frac{V_0 - V_n}{V_n}$$

where, $V_0$ is the strip velocity out of any stand $V_n$ is the velocity at a point where the strip speed and the peripheral roll speed are equal.

$S_f$ is very nearly linear with reduction of the strip for equivalent tensions on each side of a mill stand. Since the reduction taken by each stand is known, the neutral roll speed $V_n$ may be determined via the following:

$$V_n = \frac{V_0}{1 + k_s \text{ times } r}$$

where, $k_s$ is a constant of proportionality between slip and reduction r is the reduction factor.

While these relationships appear to be true, for all practical purposes in the computer component control, however, practice has shown that forward slip $S_f$ may be considered to be a constant at each stand so that $V_n = V_o$ divided by 1+s, where s is .05 for the first five stands of a six-stand strip mill and .02 for the last stand. *From these relationships, the speed at which each pair of rolls must be driven is readily determined and set up by signals routed from the output 112 to the speed regulators 58–63 (FIGS. 5A–F).*

Since the rolls and the housing of each mill stand are elastic the rolls will flatten and the housing will stretch under the forces of rolling and the gage of the strip will be greater than the roll opening, the elastic displacement being a function of roll separating force. Assuming therefore that the strip makes no elastic recovery as it is rolled, the following relationship holds:

$$S_o = S_{o(Face)} + h_{Out} - f(F, F_{(Face)})$$

where, $S_o$=screw setting, positive (mils)

$S_{o(Face)}$=screw setting at face (mils)

$h_{Out}$=strip gage out of stand (mils)

F=roll separating force (tons)

$F_{(Face)}$=roll separating force at face (tons)

$f(F, F_{(Face)})$=mill stretch (mils).

is zero; consequently, this term may be omitted so that Normally the screw position at [$S_o$ (Faec)] *$S_o$ (Face)* the mill stretch may be expressed as a function of force. If the mill stretch were linear, then $$f(F, F_{(Face)}) = \frac{F - F_{(Face)}}{M}$$

where,

M=spring constant of mill housing and rolls (tons per mil).

*The reason why the curve of FIGURE 12 does not pass through zero is that* [Actual] *actual* tests show that the relationship between stretch and force is not linear, [however] as indicated in FIGURE 12. Since the rolls are faced when static it is to be noted that a negative stretch is indicated when $F = F_{(Face)}$, *because the force must be somewhat higher than $F_{(Face)}$ to produce zero stretch under rolling conditions.*

A more sophisticated stretch curve is illustrated in FIGURE 15. The calculated stretch will be in error if the stored stretch curve does not yield true stretch. In general, the experimental modulus curve is used as the stretch curve, but some experimental evidence indicates this is not always identical to stretch. For simplicity the stretch curve is assumed to be constant even though it is thought to vary with roll size, speed, and width. In FIGURE 15 a curve having a slope m is shown, extending as a straight line. In this connection certain definitions are to be observed based upon the fundamental that $$h_o = S_o + str$$

where, $h_o$ is the calculated gage of a stand $S_o$ is the unloaded roll openings str is the stretch.

When the rolls just touch $S_o^*$=zero and at facing load $S_o$=zero. This leads to the conclusion that $h_o = S_o^* + STR$ where, $S_o^* = S_o - K_2$ (see FIGURE 15)

Therefore, $STR = K_2 - str$ (see FIGURE 15)

While the interstand gage is determined as has been previously described, this value is not necessarily used as a roll opening (gagemeter) reference in respect to all six of the mill stands shown in FIGURE 5. Since the mill is nonlinear as indicated in FIGURE 12 and the automatic gage control system described in connection with FIGURE 2 (included in FIGURE 5) is linear, in which its scaling voltage $V_{kv}$ is assumed to be linear mill stretch expressed in load cell volts per inch of stretch, the actual stretch will differ from the linear and the roll opening (gagemeter) reference will differ from the desired interstand gage. However, a relationship prevails wherein $$\left[h_{ref} = h_{calc.} + \frac{F - F_{(Face)}}{V_{kv}} - \text{stretch}\right]$$

$$h_{ref.} = h_0 + \frac{F - F_{(Face)}}{V_{kv}} - stretch$$

$$h_{ref.} = S_0 + \frac{F - F_{(Face)}}{V_{kv}}$$

thereby providing a correction of gage control with respect to the stretch curve. The scaling voltages, $V_{kv}$, are normally fed from the gage integrators of all six stands (in respect to FIGURE 5) for purposes of storing in the computer components periodically.

The determination of the proper roll opening (screwdown setting) has been shown to be dependent upon the calculation of roll separating force (see U.S. Patent 2,726,541 previously referred to). It has also been found that the roll separating force can be determined by $$F = \frac{T}{a}$$

where

T is the rolling torque (ton inches)

a is a theoretical lever arm as illustrated in FIGURE 13a. Since the power required of a stand to perform the desired reduction may be determined from power curves, and similarly the stand speeds, the total torque may be found by dividing power by speed. Since the mill efficiency is relatively constant the rolling torque may be assumed to be a fixed percentage of total torque. The lever arm a is directly proportional to the projected arc length L of the undeformed rolls (FIGURE 13a and the length L is proportional, therefor, to the square root of the product of radius R and the difference between the input gage $H_1$ and the output gage $H_2$. The ratio of lever arm a to projected arc length L is shown in FIGURE 13b and appears to be a function of strip gage at the entry of a stand (for a specific grade of steel) only, see section within dotted lines.

Visual observation of a mill in operation, however, indicates that tension affects the mill motor power requirement much more than the separating force, and the roll separating force can be expressed as a direct function of gage thereby avoiding the use of the power curve for such purposes. Consequently, the total cumulative force required to reduce a unit width of strip to a given gage may be expressed *in the form of a force curce (as described above with reference to FIGS. 9 and 10 for a given exit gage range, base temperature, and base mass flow) in* the same manner as used for the power curve shown in FIGURE 14, temperature drop in the mill and entry temperature corrections being included *by the force equation for F', as set forth above.* An increase in entry temperature has the effect of shifting the force curve downward as shown in the dotted curve of FIGURE 9.

From the previously discussed relationships, and referring again to FIGURE 5, the sequence of setup calculations for rolling a strip of steel is substantially as follows:

A signal from relay 76 is delivered to the control 110 for initiating the reading of the inputs into input 111 indicating that the bar has passed through the roughing mill 72 for the last time.

The roughing mill output width and gage are fed into input 111 from the width measuring means 77 and the gage measuring means 78, respectively, these means being selsyn transmitters attached to the roughing mill edger and horizontal setting screws.

The sideguard 33 is set to accommodate the entry width of the strip via output 112, the computer passing on this information as received from measuring means 77.

The pyrometer 80 reads its value into input 111.

The operator sets in from manual 115, or a pre-programmed peripheral storage 116 may also set in, the type of steel being rolled, together with the delivery speed and desired *final* output gage $h_6$ from the mill, this data being fed into input 111.

The computer component accordingly selects from storage 113 the stored power and force curve coefficients *for the particular members of the power and force curve families* appropriate for the *delivery* gage to be rolled.

The operator via manual 115, or the peripheral storage 116, sets in the stand VI reduction (rolls 31 and 32), together with the desired deviations from normal load distribution among stands I through V since the power required by those stands is determined, as previously shown, these inputs being fed into input 111, the total power *required for stands I through V* being determined from the stored power curve coefficients. For example, the 114 calculation may be

| | Stands | | | | |
|---|---|---|---|---|---|
| | I | II | III | IV | V |
| Operator or Peripheral | 5 | 4 | 5 | 5 | 5 |
| Stored coefficient (normal) | 6 | 4 | 4 | 2 | 1 |
| Stored constant | 10 | 10 | 10 | 10 | 10 |
| Total for 5 stands=91 | 21 | 18 | 19 | 17 | 16 |
| [Fractions of total load per stand | .231 | .198 | .209 | .187 | .186] |
| Distribution of load among stands I–V | .231 | .198 | .209 | .187 | .175 |

The calculations 114 proportions the total power between stands I through V to achieve an ampere distribution via current measuring device 91, 92, 93, 94, and 95, these devices feeding into input 111. From the *selected* stored power curve coefficients in storage 113 the calculations 114 [determines] *determine* corresponding interstand delivery gages, *i.e.*, $h_1$, $h_2$, $h_3$, $h_4$, $h_5$. The individual stand speeds are thereafter calculated, as previously described, from the mill delivery speed and the interstand and delivery gages.

Using the interstand *and* mill delivery gages and the *selected* force curve coefficients stored in storage 113, the roll force for each stand is calculated by calculations 114, as previously explained.

Using these roll forces and the [co-called] *so-called* "stretch data" for each stand previously stored in the storage 113 (which relates mill stretch to roll separating force) the unloaded roll opening for each stand is calculated from the gage equation, previously described, and this data is fed from the output 112 to the gage integrators 64, 65, 66, 67, 68, and 69, respectively. The screw position indicators 85 through 90 feed comparative data to the input 111 for carrying out the gage integrator adjustments.

Individual stand speeds are determined, as previously discussed, from the determined interstand gages by calculations 114, and transmitted from the output 112 to the speed integrators 58 through 63. Width data is transmitted also to sideguards 34 through 39 from output 112.

It is to be noted that the calculations noted above are made initially before the entry temperature of the strip is read by the pyrometer 80 in order to conserve mill setup time, using an arbitrary value of entry temperature determined from previous runs of the mill, this having to do with the selection of the power and force curves chosen from those stored. Consequently, a new setup, following a long the lines noted above, may be performed upon receipt of the entry temperature from pyrometer 80; however, many of the steps in the second calculation will not be changed so that the overall efficiency of the operation is improved.

After the strip passes between the rolls 21 and 22 of stand I a comparison is made [with] *between the calculated gage for stand I and the measured actual gage, i.e.*, the gage as determined from the output of load cell 52 (in the manner previously discussed in respect to automatic gage control referring to U.S. Patent 2,726,541) which is fed into the control 110. In the event that the calculated gage out of stand I varies beyond predetermined limits (set into the storage 113—e.g., plus or minus 3 mils) in respect to the gage so measured, the mill setup is redrafted on the basis of this comparison, the roll openings and the speeds of the following stands being readjusted accordingly by solving the calculated gage in terms of the measured gage of stand I.

Since the power and force curves are determined from data taken upon a particular strip (or bar) after the mill is completely threaded, the force predicted for stand I, for example, corresponds to the force observed in stand I, when the entire mill is threaded. However, this force will be higher than that observed when only stand I is threaded since the strip is then at a higher temperature than when the entire mill is threaded. A correction is therefore made by increasing the measured force in stand I by a factor (10% normally) to account for the drop in temperature which will occur from stand I through the remaining stands, and the resulting value is used as the mill stretch factor, corrected for each strip to its true value.

Where there has been an error in gage at stand I, as noted above, this error is proportioned among stands II through V, resulting in new interstand references, which are used to enter the force curves to calculate new forces, screw setting references, and gage references for stands II through V. Since the stand VI reduction and the delivery gage are fixed, the speed out of stand V and the calculated gage out of stand V remain constant, but the speeds of stands I through IV may change in order to maintain constant mass flow.

The roll diameters and the mill housings change their dimensions with temperature; consequently, when the roll openings are first adjusted from calculations 114, the actual opening will be less for a hot roll (larger diameter) than for a cold roll (smaller diameter). Similary the actual opening will be different for a mill housing which has become heated. Data is therefore obtained using the mass flow relationship and the stretch relationships ($S_0=h_1-$stretch), previously mentioned and providing therefrom (via an integrating amplifier—not shown) an exponentially increasing voltage having a time constant (e.g., 25 seconds) when metal is between the rolls and an exponentially decreasing voltage having a time constant (e.g., 200 seconds) when metal is not between the rolls. Similar provisions are made for the overall heating and cooling of the mill housings using time constants having exponential relationships with respect to heating and cooling of the mill housing and structure over longer periods of time. During setup calculations these deviations are included in the calculations 114, properly apportioned for each stand, in terms of corrections to the calculated roll openings.

Under certain circumstances the mill's capacity may be questionable in that the interstand gages, stand speeds, and unloaded roll openings calculated by the method outlined above may not be within the physical limitations of the mill. Of primary concern in this respect is that the power and speed requirements of the drive motors (40 through 45 of FIGURE 5) will not be exceeded.

The power required from a mill motor is determined using the power curve, i.e., the required horsepower per ton per hour (kw. per inch of width) *as the difference*

*between the* [ordinate] *ordinates* of the power curve corresponding to the incoming *and* delivery gage of the stand, this being multiplied by the mass flow (tons per hour) calculated from strip *delivery* gage, width, roll speed and slip, the resulting product being multiplied by the temperature correction coefficient to correct for entry temperature. The power required increases as temperature decreases; therefore, maximum power is required at the tail end of the strip. To make use of this relationship an approximate temperature rundown is stored in the storage 113 as a constant, which is subtracted from the head end temperature, the power required by the drive motor of each stand $P_{i(Rqd)}$ being so calculated. A power coefficient $C_{pi}$ may therefore be determined from $$C_{pi}=\frac{P_{i(Rqd.)}}{P_{i(max.)}}$$

where $P_{i(Rqd)}$ is the power required by any stand i
$P_{i(max)}$ is the maximum permissible power for that stand When any $C_{pi}$ exceeds unity, the power limitation is exceeded.

The speed requirement of the mill drill motors may be represented by a speed cone as shown by the lines [$P_1q_1$] $P_1P_6$ and [$P_6q_6$] $q_1q_6$ of FIGURE 16, which depicts the operational limits of the speed of each stand in the strip mill. The dotted line Y illustrates a mill speed where both the upper and lower speed limits of one or more of the drive motors are exceeded, the dash-dot line Z illustrates a mill speed where the lower speed limit is exceeded, and the dashed line X illustrates a mill speed where the operational speed requirement is within the ranges of speeds of all of the drive motors.

In connection with speed limitation a minimum and maximum speed coefficient are formed for each stand. The minimum speed coefficient is $$C_{Li}=\frac{N_{i(min.)}}{N_{i(Rqd.)}}$$

where, $N_{i(min)}$ is X% of the base speed of the stand, (normally 60%)
$N_{i(Rqd)}$ is the speed required for the calculated setup.

The maximum speed coefficient is $$C_{Hi}=\frac{N_{i(Rqd.)}}{N_{i(max.)}}$$

where, $N_{i(max)}$ is the top speed of the stand.

If either $C_{Li}$ or $C_{Hi}$ exceeds unity for any stand, the speed falls outside the speed cone and corrective action is necessary.

For purposes of correlation with the corrective actions discussed hereinafter the following additional coefficients are determined;

$C_{LL}$=Maximum $C_{Li}$ (The speed coefficient for the stand having the lowest speed relative to its minimum speed)
$C_{HH}$=Maximum $C_{Hi}$ (The speed coefficient for the stand having the highest speed relative to its top speed)
$C_{pp}$=Maximum $C_{pi}$ (The power coefficient for the stand having the greatest power requirement relative to its maximum).

The following situations therefore pertain:

$$\left[\frac{C_{LL}\text{ times }C_{HH}>1}{\text{If }C_{LL}\text{ times }C_{HH}>1}\right]$$

*Case A: $C_{LL}$ times $C_{HH}>1$*

*If $C_{LL}$ times $C_{HH}>1$,* either (a) the speed of at least one stand is above top *speed* while the speed of another is below its minimum, or (b) the speed of a stand is so far above top speed that reducing it to top speed while reducing the speeds of all other stands proportionally will require the speed of at least one stand to be below its minimum, or (c) the speed of a stand is so far below its minimum that increasing its speed to minimum speed while increasing the speed of all other stands proportionally will require the speed of at least one stand to be above top speed. The first case is illustrated *by dotted line Y* in FIGURE [6] *16*. When $C_{LL}$ times $C_{HH}>1$ we concluded that it is not possible to roll the strip with the load distribution requested by the operator. Hence the load is redistributed assigning equal loads to the first five stands (unless a stand has been dummied, i.e., assigned zero load, in which case it remains dummied) and the setup [calculated] *calculation* is repeated. If the loads are already equal the entry tables are stopped.

$$\left[\frac{C_{LL}\text{ times }C_{pp}>1}{\text{If }C_{LL}\text{ times }C_{pp}>1}\right]$$

*Case B: $C_{LL}$ times $C_{pp}>1$*

*If $C_{LL}$ times $C_{pp}>1$,* we may conclude that the mill has insufficient power to roll the strip with the desired load distribution. This conclusion is based on the assumption that power is proportional to mill speed. Either (a) the speed of a stand is below minimum and the power of a stand is above maximum, (b) the speed is below minimum and increasing it to the minimum while raising all other stand speeds proportionally will cause the power limitation to be exceeded, or (c) the power is above maximum for some stand and reducing it to the maximum will require a stand to be below minimum speed. In any case the loads are equalized for the first five stands and the setup calculation repeated. If they are already equal the entry tables are stopped.

$$\left[\frac{C_{pp}>1}{\text{If }C_{LL}\text{ times }C_{PP}<1\text{ but }C_{pp}>1}\right]$$

*Case C: $C_{pp}>1$*

*If $C_{LL}$ times $C_{pp}<1$ but $C_{pp}>1$,* the mill is either (a) drafted in such a way as to cause a stand to take too much of the total load, or (b) the desired delivery speed of the mill is too high. The remedy attempted is to equalize the loads of the first five stands. If they are already equal, the speeds of all stands are divided by $C_{pp}$ and the mill is set up accordingly.

$$\left[\frac{C_{LL}>1}{\text{If }C_{LL}\text{ times }C_{HH}<1\text{ but }C_{LL}>1}\right]$$

*Case D: $C_{LL}>1$*

*If $C_{LL}$ times $C_{HH}<1$ but $C_{LL}>1$,* the speed of at least one stand is below minimum but it may be raised to its minimum speed and all others raised proportionally without the speed of a stand being required to be above top speed. However the first action taken is to equalize the load on the first five stands. If that has already been done and does not remedy the situation, then all stand speeds are increased by multiplying them by $C_{LL}$ and the mill is set up accordingly. If the operator has called for an unequal load distribution on stands I through V the resulting setup will have a different load distribution and a different delivery speed from that desired by the operator.

$$\left[\frac{C_{HH}>1}{\text{If }C_{LL}\text{ times }C_{HH}<1\text{ but }C_{HH}>1}\right]$$

*Case E: $C_{HH}>1$*

*If $C_{LL}$ times $C_{HH}<1$ but $C_{HH}>1$,* the speed of at least one stand is above top speed but may be reduced to top speed and all other speeds reduced proportionally without the speed of a stand being required to be below its minimum. The corrective action for this case is the same as for the preceding case except that if the situation is not remedied by equalizing the load distribution, all speeds are divided by $C_{HH}$.

During the rolling process certain data are taken for the purposes of updating the stored information in storage 113 of the computer component. These data may be also transferred via the output 112 to recording peripheral 118 for purposes of record and analysis, or in the event that limits are exceeded (e.g., speed cone excess), the data can be indicated as an alarm or by a visual indication, or both, via the output 112 to the audio-video peripherals 117. In addition to those [sening] *sensing* devices already described, therefore, the following are used as indicated for the purpose of providing checking data, updating data, or control data as indicated:

Hot metal detector 81 senses the presence of the strip 20 leaving the mill, indicating in the event of a failure that a cobble occurred in stand VI.

X-ray gage 71 (and its feedback 71a) not only measures *actual* gage $h_6$ of emerging strip, but also classifies "on" and "off" gage of the strip which may be recorded in peripheral 118.

Width gage 82 similarly provides data for classifying "on" and "off" width of the strip which may be recorded in peripheral 118.

Pyrometer 83 measures the finish temperature of the strip emerging from the mill and provides data for logging into peripheral 118.

Hot metal detector 84 measures the temperature and senses the presence of the strip at the coiler, indicating in the event of a failure that a cobble exists on the run out table (not shown), transmitting such information to the control 110.

Tachometers 103 through 108 read speeds of each stand (*thereby signaling roll velocity from which any stand strip velocity Vi may be determined, as explained above*) for updating data stored in storage 113, this data also being transmitted to recording peripheral 118 when required.

Voltage recorders 97 through 102 provide drive motor voltage data to the recording peripheral 118.

The utilization of data determined from actual rolling of the strip for updating the data stored in the computer is primarily for overcoming errors and discrepancies that may occur beyond the normal control utilized in the actual rolling process of one strip so that compensation can be made in the next strip to be rolled. Errors of small magnitude in speed and roll openings as well as non-uniformity of the raw material, mill characteristics changes other than those already discussed, roll wear, etcetera are compensated for by what may be termed adaptive feedbacks. These may be considered as follows:

INTERSTAND GAGE FEEDBACK

Interstand gage feedback causes the [calculated] *gagemeter* gage of a stand *calculated from the load cell signal and screw setting signal* (i.e., $S_0$ plus stretch) to equal the mass flow gage (i.e., $h_6V_6$ divided by $V_1$) of that stand. This feedback compensates for errors in both $S_0$ and stretch due to temperature errors, poor roll facing, or the like. The [mass flow] correction *thus derived from mass flow data* is calculated on each stand and on each strip (or bar) and is applied to the setup of the following strip (or bar). It is an accumulated correction, whose value at the rolling of any strip is the algebraic sum of the *incremental correction* values for all preceding strips. On any given strip the incremental correction is equal to the difference between the calculated gage and the mass flow gage modified by the appropriate gain. The correction is considered positive, if the mass flow gage exceeds the calculated gage, and is algebraically combined with the accumulated [mass flow] correction *derived from mass flow data* from all previous strips and is used in calculating both the setup screw settings (roll openings) and the mass flow gage for the following strip. The interstand gage correction is continuously generated from one roll change to the next, and limits are provided in the computer storage to prevent excesssive corrections, bar to bar.

The mass flow feedback is calculated from the following:

$$h'_{mf(j+1)i}=h'_{mf(j)i}+k_{mf} \text{ times } \Delta h_{mf(j+1)i}$$

where, $k_{mf}$ is mass flow feedback gain $$\Delta h_{mf(j+1)}=h_{mf(j)} \text{ minus } h_{gm(j)}$$

$$h_{gm(j)}=S_0+str$$

where, $h_{gm(j)}$ is calculated gage (gagemeter)

$S_0$ is determined from measured [gage] *screw position* (volts)

str is calculated from *the* stretch curve at actual rolling *force as measured by the load cells* j is the last strip rolled j+1 is the next strip to be rolled i denotes the mill stand

LOAD DISTRIBUTION FEEDBACK

Depending upon the gage of the strip being rolled, it is desirable to distribute the current among Stands I through V in accordance with the load distribution switch settings and the distribution pattern stored in the computer.

In order to maintain this desired distribution, the computer compares on each bar, the percent load calculated on any stand from the power curve using the gages actually being rolled, with the actual percent load as determined from current sensors on the mill. If the new feedback coefficient, taken as *the* ratio of the actual percent load on any stand to the calculated percent load, is other than unity, an updated correction multiplied to be added to the power curve for the setup of the next bar is computed as the sum of the multiplier used on the present bar and the new feedback coefficient weighted in accordance with the load distribution feedback gain. Thus, it is seen that the effect of this feedback is continual adaptation of the stored power information in accordance with the results obtained from actual rolling. Limits are stored in the computer to prevent excessive changes, bar to bar, in the load distribution multiplier.

ROLL SPEED FEEDBACK

As a part of the setup calculation, the computer determines the loaded stand speeds *as described previously*. It then adds a fixed percentage (about 3%) to these speeds to account for speed droop and the resulting no load speed is set before the bar enters the mill.

With the bar in the mill, the actual speed drop may be different from the value anticipated. To compensate for this effect, the speed reference sent to the regulators may be required to vary slightly from bar to bar. A new feedback coefficient taken as the ratio of actual loaded speed to desired speed is calculated for each stand and if the ratio is other than unity, a correction multiplier for the next bar setup is computed from the sum of the multiplier used on the present bar and the new feedback coefficient weighted in accordance with the roll speed feedback gain. Limits are placed on the roll speed multiplier so that it cannot change excessively bar to bar. Each roll speed multiplier is divided by the Stand VI multiplier. This results in roll speed changes being made only with respect to Stand VI speed.

ROLL FORCE FEEDBACK

The purpose of the roll force feedbacks is continual adaptation of the stored roll force information. This is done by comparing the force distribution calculated (*from the appropriate one of the stored force curves*) for actually rolled gages (*gagemeter gages*) to the measured roll forces (*signaled by the load cells*) for these gages.

A new force feedback coefficient, equal to the ratio of the measured force to the force predicted from the stored force curves is calculated for each stand on each bar. If this ratio is other than unity, an updated force correction multiplier is calculated to be applied to the data obtained from the [power] *force* curve for the setup of the next bar. This correction is the sum of the multiplier used on the present bar and the new force feedback coefficient weighted in accordance with the force feedback gain. Limits are placed on the force multiplier so that it cannot change excessively bar to bar.

STRIP SPEED FEEDBACK

The purpose of the strip speed feedback is to allow the computer to produce the desired delivery speed. A strip speed multiplier is calculated from the ratio of the desired strip speed to the actual strip speed. If this ratio is other than unity, an updated speed correction multiplier is calculated to be applied to the finishing speed of the next bar. This correction is the sum of the multiplier used on the present bar and the new speed multiplier weighed in accordance with strip speed feedback gain. Limits are placed on the strip speed multiplier so that it cannot change excessively from bar to bar.

While the crux of automatic operation of a strip mill, as discussed above, lies with the power and force curves in respect to the materials being processed, it nevertheless lies with the adaptive feedbacks in respect to the operation of the mill. The mass flow relationship, previously discussed, provides a basis normally for finalization of mill setup in terms of gage or thickness reference, roll openings and speeds for each stand in the mill. For example, since the X-ray gage 71 (see FIGURE 5) accurately measures the output gage of stand VI, the speeds of stand VI and some other stand being also measured, the gage out of the other stand can be definitely determined. By equating this determined gage to the calculated gage for that stand, the error in the calculated gage becomes evident. This error is then added (algebraically) to the calculated gage for that stand for the next setup of the mill for each subsequent strip or bar. In this instance the error may be due to irregularities in the actual roll setting mechanism, to improper considerations of the stretch factor, to roll heating, to improper roll facing in the mill, or to a combination of two or more of these factors. Consequently, the adaptive feedbacks, as verified from actual rolling results, represent major facets of the automatic operation of the strip mill.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. The method of setting up a rolling mill for reducing a strip of metal of known composition from a first thickness to a second thickness by passing it through pairs of rotating rolls with a predetermined [extent] *exit* speed comprising the steps of *:selectively retrieving from a computer memory digital signals representing one of a family of curves plotting power against thickness for a predetermined range of second thicknesses including said second thickness, said curve selected being one of a family of such curves each represented in said memory for different respective second thickness ranges;* calculating with the retrieved signals in a computer the total power requirement for said reduction [from a family of curves, each curve of said family being derived from plotting power against thickness for a different thickness range of said composition, proportioning the power requirement for each said pair of rolls, and determining the opening between each pair of rolls according to its power requirement by reference to one of said family of curves corresponding to the said second thickness.] *and calculating in a computer signals representing the respective proportions of said total power requirement for said respective pairs of rolls; calculating in a computer, with the retrieved signals representing said curve and said proportion signals, signals representing the opening between each of said pairs of rolls according to its power requirement and, utilizing said opening-representing signals to set the openings between the rolls of the corresponding pairs.*

2. The method set forth in claim 1 with the further step of [determining] *calculating in a computer signals representing* the rate of rotation of any pair of rolls by reference to *signals representing* the said exit speed according to the ratio of [the determined roll opening and the] said second thickness *and the determined roll opening.*

3. The method set forth in claim 1 with the further step of [determining the force on each pair of rolls according to its roll opening by reference to a family of curves, each curve of said family being derived by plotting roll force against thickness.] *selectively retrieving, from a computer memory, digital signals representing one of a family of curves plotting cumulative roll force against thickness for a predetermined range of second thicknesses, said curve selected being one of a family of such curves each represented in said memory for different respective second thickness ranges, and calculating in a computer with the signals representing said selected curve, signals representing the force on each pair of rolls according to its determined roll opening to determine the predicted force on each pair of rolls.*

4. The method set forth in claim 3 with the further step of determining the elastic deviation of each said pair of rolls by [reference to] *retrieving from a computer memory digital signals representing* a curve derived from plotting force against elastic deviation *and calculating in a computer elastic deviation therewith,* and [adding] *subtracting digital signals representing* the value of each said deviation [to] *from digital signals representing* the determined roll opening for each pair of rolls to provide *signals representing* a value *used* for setting the unloaded opening of said pair of rolls.

5. A rolling mill including pairs of rolls through which a strip of metal is passed to bring about a reduction in cross-sectional dimensions, [deriving] *driving* means for rotating said rolls, means for setting the openings between said rolls, means including stored data for controlling said driving means and said setting means, means for sensing the rate of rotation of said rolls and means for measuring the settings of said openings during a predetermined reduction of said strip, means for comparing the values of said sensing means and said measuring means with said data, and means for updating said stored data for controlling said driving means and said setting means for a similar reduction of strip to be passed through said pairs of rolls subsequently.

6. The invention set forth in claim 5 with the further provision of *means including said stored data for predicting the forces between said pairs of rolls during rolling of a strip and from such predicted forces controlling said setting means, means for measuring the actual forces between said pairs of rolls during rolling of the strip,* means for comparing [the said values] *the predicted and actual gages calculated from the predicted and actual forces* after the strip has passed through a predetermined number of pairs of rolls, and means for readjusting the said driving means and the said setting means of the remaining pairs of rolls in accordance with said comparison *of predicted and actual gages to compensate for any deviation therebetween.*

7. An automated rolling mill including pairs of rolls through which a strip of steel is passed for reducing its cross-sectional dimensions, means for setting the openings between each pair of rolls, means for rotating each pair of rolls at a predetermined rate, means for storing data according to predetermined conditions of reducing a strip of known composition, said data relating to said setting means and rotating means, and means for calculating values from data in said storing means for controlling the said setting and the said rotating means whereby a predetermined reduction of said strip is obtained.

8. An automated rolling mill including [pair] *pairs* of rolls through which a strip of steel is passed for reducing its cross-sectional dimensions, means for setting the openings between each pair of rolls, means for rotating the pairs of rolls at predetermined rates, means for storing data according to predetermined conditions of reducing a strip of known composition, said data relating to said setting means and said rotating means, means for sensing variations in said cross-sectional dimensions at each of said pair of rolls during the passage of said strip, means for storing said variations, means for combining said stored data and said stored variations, and calculating means for determining from said combined data values for controlling said setting means and said rotating means for each subsequent strip passing through said mill.

9. In a rolling mill having a pair of rolls through which a metal strip is passed to be reduced in cross-sectional dimensions under a predetermined force applied to said rolls the method of determining the loaded roll opening for a predetermined *roll setting* [reduction] by [calculations of values derived from] *retrieving from a computer memory digital signals representing* a curve plotting elastic deformation in respect to said pair of rolls against applied force, *calculating in a computer elastic deformation with the retrieved signals* and [subtracting] *adding in a computer digital signals representing* any corresponding non-linear [force deviation] *deformation* [from] *to digital signals representing* the value of said predetermined [force] *roll setting to determined loaded roll opening.*

10. In a hot strip rolling mill having pairs of rolls through which a hot metal strip is passed to be reduced in cross-sectional dimensions wherein a series of strips is fed intermittently the method of compensating for the expansion and contraction of said rolls as a result of heat absorption thereby by introducing into *computer calculations of* the adjustment of the roll opening of said pairs of rolls *a signal representing* an exponentially increasing compensation when the strip is between the rolls and an exponentially decreasing compensation when the strip is not between the rolls.

11. In a strip rolling mill having a plurality of stands, each stand including a pair of rotating rolls between which a metal strip is fed to reduce its cross-sectional dimensions, the method of [determining] *calculating in a computer signals representing* a power coefficient based upon *the ratio of* the power requirement of the stand and the maximum permissible power of the stand and of [determining] *calculating in a computer signals representing* maximum and minimum speed coefficients for each stand *respectively* based upon *(a) the ratio of* the speed requirement of each stand [and] *to* maximum [and minimum speeds] *speed* of each stand [respectively] *and (b) the ratio of the minimum speed of each stand to the speed requirement for that stand, and processing said signals in a computer to determine if the respective values represented exceed unity,* whereby the value of any said coefficient exceeding unity denotes the respective power, maximum speed or minimum speed ranges of the said mill have been passed and rolling operations at such values can not be performed.

12. The method set forth in claim 1 including the further steps of comparing *in a computer signals representing* the [determining load] *actual power* mill stand of a multi-stand mill with the *signals representing the calculated* [actual] *power* [percentage load measured] for each stand according to exit thickness of a strip being rolled, and updating *the source of digital signals representing said curve* [the said power curve] for a subsequent passage of a strip through said mill.

13. The method set forth in claim 3 including the further steps of [comparing the] *calculating in a computer, with signals representing computed actual interstand gages of a strip being rolled, signals representing the* roll forces of each mill stand of a multi-stand mill, *and comparing in a computer the latter signals* with *signals representing* actual measured forces for each stand [according to exit thickness of a strip being rolled], and updating the [said force curve] *source of said digital signals representing said curve plotting cumulative roll force against thickness according to such comparisons* for a subsequent passage of a strip through said mill.

14. The method of claim [3] *11* including the further step of [determining] *calculating in a computer signals representing* the *minimum and maximum speed* coefficients, *respectively,* [of force from one of said force curves] for the stand having the lowest speed relative to its minimum speed, and *for* the stand having the highest speed relative to its maximum speed [wherein the product of said coefficients is greater than unity, and setting the loads of all stands equal.]*; multiplying in a computer said latter two coefficients to produce signals representing their product; and utilizing said latter signals when the product represented thereby is greater than unity to set the loads of a plurality of stands equal.*

15. The method of claim [3] *11* including the further step of *calculating in a computer signals representing* [determining] the *minimum speed and the power* coefficients [of force from one of said force curves speed] *respectively* for the stand having the lowest speed relative to its minimum speed and [of power from said power curve] for the stand having the greatest power requirement relative to its maximum power [wherein the product of said coefficients is greater than unity, and setting the loads of all stands equal.]*; multiplying in a computer said latter two coefficients to produce signals representing their product; and utilizing said latter signals when the product represented thereby is greater than unity to set the loads of a plurality of stands equal.*

16. The method of claim 14 including the further step of determining [the coefficients of force] *by calculations in a computer* when the said product is less than unity and the *signals representing the minimum speed* coefficient of the stand having the lowest speed [is greater than unity] relative to its minimum speed *indicate that said minimum speed coefficient is greater than unity, and then* [, and setting] *utilizing said last-mentioned signals to set* the loads of [all] *a plurality of* stands equal.

17. The method of claim 14 including the further step of determining [the coefficients of force] *by calculations in a computer* when the said product is less than unity and the *signals representing the minimum speed* coefficient of the stand having the lowest speed [is greater than unity] relative to its minimum speed [, and] *indicate that said minimum speed coefficient is greater than unity, and then* multiplying *in a computer* the *signals representing the* speed of all stands by the *signals representing the* value of the last said coefficient *and setting the stand speeds according to products of said last-mentioned multiplications.*

18. The method of claim 14 including the further step of determining [the coefficients of force] *by calculations in a computer* when the *signals representing the* said product is less than unity and the *maximum speed* coefficient of the stand having the highest speed [is greater than unity] relative to its maximum speed *indicates that the maximum speed coefficient is greater than unity, and then* [, and setting] *utilizing said last-mentioned signals to set* the loads of [all] *a plurality* of stands equal.

19. The method of claim 14 including the further step[s] of determining [the coefficients of force] *by calculations in a computer* when the said product is less than unity and the *signals representing the* coefficient of the stand having the highest speed [is greater than unity] relative to its maximum speed *indicate that such maximum speed coefficient is greater than unity, and then* [, and] dividing *in a computer* the *signals representing the* speeds of all stands by the value of the *signals representing the* last said coefficient *and utilizing the signals representing the quotients of said divisions to set the stand speeds.*

20. The method of claim [14] *15* including the further step of determining [the coefficients of force and power] *by calculations in a computer* when the said product is less than unity and the *signals representing the power* coefficient of the stand having the greatest power requirement [is greater than unity] relative to its maximum power [, and] *indicate that such power coefficient is greater than unity, and then* [setting] *utilizing said last-mentioned signals to set* the loads of [all] *a plurality of* stands equal.

21. In a rolling mill having pairs of rolls between which a hot metal strip is passed to be reduced in cross-sectional dimensions, the method of determining the rate of rotation of said rolls and the gage of said strip emerging from any said pair of rolls by continuously monitoring data derived from roll force and rolls opening during the current passage of a strip, evaluating said data in terms of similar data derived from a preceding passage of a strip, calculating corrections of said data to conform with formulated adjustments of said rate and gage, and storing said corrections for updating adjustments of rate and gage for a subsequent passage of a strip.

*22. The method of reducing a metal strip by passage through the rolls of a succession of mill stands, comprising the steps of storing in a computer memory data which are derived from sensing of interrelated variables (such, for example, as power, speed, force, temperature, stretch, mass flow, unloaded roll openings, interstand and exit gages) during previous actual rolling of a similar strip in the mill stands, retrieving signals from such stored data and calculating in a computer therewith the values of at least one set-up parameter according to the sensed or commanded values of certain variables for the strip to be rolled, said stored data including stored correction factors which result in the computation of set-up parameter values altered from the values which would be obtained solely from data derived from previous rolling of a similar strip, physically adjusting said mill stands to operate with the altered values of the computed set-up parameter, passing the strip through the mill stands with the latter so adjusted, sensing certain physical conditions of the mill stands and signaling therefrom the actual values of one variable while the strip is being rolled, signaling the predicted values of said one variable as computed from said stored data while the strip is being rolled, comparing said actual values and said predicted values and signaling discrepancies therebetween, and updating said stored correction factors by amounts which are related by fractional gain factors to said discrepancies, whereby the set-up for rolling of a subsequent strip will result in closed correspondence of said actual and predicted values and in greater accuracy in the reduction of a subsequent strip.*

*23. The method set forth in claim 22 and wherein said signaling of predicted values includes sensing of certain other physical conditions of the mill stands while the strip is being rolled and using the sensed values and the stored data to compute in a computer and signal said predicted values of the said one variable.*

*24. The method set forth in claim 22 further characterized in that said updating step includes the step of limiting the amounts of updating of said stored correction factors to a predetermined magnitude whenever the amounts of updating related by said gain factor to said discrepancies would otherwise exceed said predetermined magnitude.*

*25. The method of reducing a metal strip by passage through the rolls of a succession of mill stands, comprising the steps of calculating in a computer signals representing desired values of interstand gages which the strip is to have as it leaves the different stands, calculating in a computer signals representing the expected values of forces to be exerted upon the strip by the rolls of the different stands, calculating in a computer signals representing the unloaded openings between the rolls of the different stands by subtracting from the desired interstand gages therefor values of stretch which correspond to the expected forces and algebraically combining an accumulated correction factor, passing the strip through the mill stands with the rolls set to have the said unloaded openings, signaling the speeds of the rolls in all stands and the thickness of the strip exiting from the last stand while the strip is being rolled and from such speed signals computing in a computer a mass flow gage for each stand, signaling the forces actually exerted by the respective stands while the strip is being rolled and from such force signals and the unloaded roll openings computing in a computer a gagemeter gage for each stand, calculating in a computer signals representing incremental correction factors for each stand equal to the difference between the computed mass flow gage and computed gagemeter gage modified by a gain factor, and algebraically combining in a computer said incremental correction factor with signals representing the said accumulated correction factor for the corresponding stand, so that the accumulated correction factors are updated for improved accuracy in the rolling of subsequent strips.*

*26. The method of reducing a metal strip by passage through the rolls of a succession of mill stands, comprising the steps of calculating in a computer signals representing desired values of interstand gages which the strip is to have as it leaves the different stands; retrieving from stored data in a computer signals representing a curve of cumulative force vs. gage and calculating in a computer therewith and with the signals representing said desired values of interstand gages, the forces which are to be exerted by the rolls of the different stands upon the strip; said calculating step including the use of signals representing a correction multiplier applied to the force values obtained from the force curve data; computing the stretch of the different stands from retrieved signals representing stored stretch data and from signals representing said forces and utilizing such computed stretch and the desired values of interstand gages to set the unloaded roll openings of the different stands; passing the strip through the mill, stands with the unloaded roll openings to set; measuring and signaling the actual forces exerted on the strip by the different stands; computing in a computer and signaling the actual interstand gages of the strip during rolling; computing, in a computer from the signaled actual interstand gages and from the stored force curve data signals and the correction multiplier signals, signals representing the predicted values of forces exerted on the strip by the different stands; calculating in a computer and signaling the ratio of the measured actual force to the predicted force values for each stand; and updating said correction multiplier for each stand by an amount equal to said ratio for that stand weighted with a gain factor; so that the signals representing the correction multipliers are changed to improve accuracy in the rolling of subsequent strips.*

*27. The method of reducing a metal strip by passage through the rolls of a plurality of mill stands, comprising the steps of computing in a computer signals representing the desired values of powers to be supplied by the different stands; retrieving from stored data in a computer signals representing a curve of cumulative power vs. gage, and calculating in a computer therewith and with the signals representing the desired power values, signals representing the desired values of interstand gages which the strip is to have as it leaves different stands; said calculating step including the use of signals representing a correction multiplier applied to the power values obtained from the power curve data; utilizing said desired interstand gages so calculated to set the roll openings of the respective stands; sensing and signaling the values of actual powers used by the different stands during rolling of the strip; computing in a com-*

*puter and signaling the actual interstand gages of the strip during rolling; computing in a computer, from the retrieved signals representing the stored power curve data, and from the signals representing said computed actual interstand gages, signals representing the values of predicted powers for the different stands; calculating and signaling the ratio of the actual power to the computed predicted power for each stand; and updating the source of signals representing said correction multiplier for each stand by an amount equal to said ratio for that stand weighted with a gain factor; so that the correction multipliers are changed to improve accuracy in the rolling of subsequent strips.*

*28. The method of reducing a metal strip by passage through the rolls of a succession of mill stands, comprising the steps of calculating in a computer signals representing the desired values of interstand gages which the strip is to have as it leaves the different stands; computing in a computer according to a mass flow relation, from the said signals representing interstand gages and from signals representing a desired final strip exit speed, signals representing the desired speeds of the rolls for the different stands; said computing step including the use of signals representing correction multipliers applied to the roll speeds obtained from the mass flow relation; applying speed reference signals to driving means for the rolls of the different stands to command roll speeds corresponding to the said computed values while the strip is being rolled; sensing and signaling the actual speeds of the different stands while the strip is being rolled; computing in a computer with the signals representing actual and desired speeds the ratio of the actual speed to the desired speed for each stand while the strip is being rolled; and updating the source of signals representing the correction multipler for each stand by an amount equal to the said ratio for that stand weighted in accordance with a gain factor; so that the correction multipliers are changed to improve the accuracy of speed control in the rolling of subsequent strips.*

*29. The method of reducing a given metal strip by passage through the rolls of a succession of mill stands, comprising the steps of measuring and signaling the forces exerted by the individual stands and determining the entry, interstand and final exit gages during the rolling of a previous strip to obtain stored data in a computer memory that is retrievable in the form of signals defining points on a curve of cumulative force vs. thickness, measuring and signaling the stretch vs. force relationship for each of said stands and storing data in a computer memory which is retrievable in the form of signals substantially representing a curve of stretch vs. force for each stand, calculating in a computer prior to the rolling of said given strip signals representing the desired values of strip thickness at the output of each stand, computing in a computer, from the signals representing said desired values and from retrieved signals representing the stored force curve, signals representing the estimated force to be exerted by each stand in order to produce the thickness reduction desired in that stand, computing in a computer from the signals representing the computed force and the signals representing the stored stretch curve for each stand signals representing the estimated stretch which will exist during rolling of the strip, subtracting the signals representing the estimated stretch from the signals representing the desired thickness value for each stand to compute in a computer and signal an unloaded roll opening signal for that stand, adjusting the rolls of each stand to have the computed unloaded roll opening therefor, and rolling the given strip with the roll openings so adjusted.*

*30. The method set forth in claim 29 further including the steps of storing in a computer data retrievable in the form of signals representing the value of the base mass flow per unit of width for the previous strip when the latter is rolled to obtain data in the form of signals defining points on the cumulative force vs. thickness curve, computing in a computer and signaling the desired actual mass flow per unit of width which will exist for the given strip during rolling thereof, sensing and signaling the actual width of the given strip, and multiplying in a computer each estimated force computed from the signals representing said stored force curve data by both (1) said actual width and (2) a compensating factor which differs from unity in a sense and by an amount correlated respectively to the ratio of (a) of the difference between said base and actual mass flows and (b) said mass flow, thereby to compute signals representing estimated forces corrected for departures of the actual strip velocities from the values applicable to the stored force curve data.*

*31. The method set forth in claim 29 further including the steps of storing in a complete data retrievable in the form of signals representing the value of the base entry temperature of said previous strip when the latter is rolled to obtain data defining points on the cumulative force vs. thickness curve, sensing and signaling the value of the actual entry temperature of the given strip before it enters the first stand, and multiplying in a computer signals representing the values of each estimated force computed from said stored force curve data by a compensating factor which differs from unity in a sense and by an amount correlated respectively to the sign and magnitude of the difference between said base entry temperature and said actual signaled entry temperature, thereby to compute estimated forces corrected for departures of the actual temperature from the value applicable to the stored force curve data.*

*32. The method set forth in claim 29 further characterized in that a plurality of previous strips are rolled to respectively different final delivery gages while measuring and signaling the forces exerted by the individual stands to obtain and store data in a computer retrievable in the form of signals which substantially represent a family of cumulative force vs. thickness curves, each applicable to a different range of final delivery gages; signaling the final delivery gage desired for the given strip to be rolled; and, in the computation in a computer of estimated force to be exerted by each stand, utilizing the particular set of stored force curve data which is applicable to the delivery gage range in which said desired final delivery gage falls.*

*33. The method of reducing a metal strip by passage through the rolls of a succession of mill stands, comprising the steps of (1) determining by calculations in a computer and signaling desired set-up values of variout operating parameters of the millstands, (2) adjusting the mill stands to operate with such signaled values during rolling of the strip, said parameters including a desired power to be exerted by each mill stand during rolling of the strip, (3) storing in a computer data in a form retrievable as signals representing the values of the maximum powers which the respective stands are rated to produce, (4) comparing in a computer the signaled desired power and the signals representing the maximum power of each stand and signaling when the former exceeds the latter for any stand, and (5) in response to the latter signaling repeatings steps (1) and (2) with predetermined corrective modifications before the strip enters the first stand.*

*34. The method of reducing a metal strip by passage through the rolls of a succession of mill stands, comprising the steps of (1) determining by calculations in a computer and signaling desired set-up values of variout operating parameters of the millstands, (2) adjusting the mill stands to operate with such values during rolling of the strip, said parameters including a desired speed at which the rolls of each stand are to be driven, (3) storing in a computer data in a form retrievable as signals representing the values of the maximum speeds at which*

*the respective stands are capable of operating, (4) comparing in a computer the desired signaled speed with the signals representing the maximum speed for each stand and signaling when the former exceeds the latter for any stand, and (5) in response to the latter signaling repeating steps (1) and (2) with predetermined corrective modifications before the strip enters the first stand.*

*35. The method of reducing a metal strip by passage through the rolls of a succession of mill stands, comprising the steps of (1) determining by calculations in a computer and signaling desired set-up values of variout operating parameters of the millstands, (2) adjusting the mill stands to operate with such values during rolling of the strip, said parameters including a desired speed at which the rolls of each stand are to be driven, (3) storing in a computer data in a form retrievable as signals representing the values of the minimum speeds at which the respective stands are capable of operating, (4) comparing in a computer the desired signaled speed with the signals representing the minimum speed for each stand and signaling when the latter exceeds the former for any stand, and (5) in the response to the latter signaling repeating steps (1) and (2) with predetermined corrective modifications before the strip enters the first stand.*

*36. The method of reducing a metal strip by passage through the rolls of a succession of mill stands, comprising the steps of (1) determining by calculations in a computer and signaling desired set-up values of various operating parameters of the mill stands based upon a predetermined apportionment of total power among the individual stands, (2) adjusting the mill stands to operate with such values during rolling of the strip, said parameters including a desired speed at which the rolls of each stand are to be driven, (3) storing in a computer data in a form retrievable as signals representing the values of the maximum and minimum speeds at which the respective stands are capable of operating, (4) comparing in a computer the desired signaled speed with the signals representing the maximum speed for each stand and signaling when the former exceeds the latter for any stand, (5) comparing in a computer the desired signaled speed with the signals representing the minimum speed for each stand and signaling when the latter exceeds the former for any stand, and (6) in response to the signaling as a result of either of steps (4) or (5), repeating steps (1) and (2) with predetermined corrective modifications before the strip enters the first stand.*

*37. The method of claim 36 wherein said predetermined corrective modifications consist of signaling from a computer equal apportionment of total power among said succession of mill stands.*

References Cited

The following references, cited by the Examiner, are of record in the patented file of this patent or the original patent.

UNITED STATES PATENTS

| | | | |
|---|---|---|---|
| Re. 25,795 | 6/1965 | Schurr et al. | 72—12 |
| 3,111,046 | 11/1963 | Koss et al. | 72—15X |

OTHER REFERENCES

Control Engineering, September 1956, pp. 116-117.
Westinghouse Engineer, March 1957, pp. 40-41.

MILTON S. MEHR, Primary Examiner

U.S. Cl. X.R.

72—11, 16